(12) United States Patent
Sotoda et al.

(10) Patent No.: US 7,084,837 B2
(45) Date of Patent: Aug. 1, 2006

(54) DIGITAL IMAGE OUTPUT APPARATUS, DIGITAL IMAGE DECODING DEVICE, AND DIGITAL IMAGE ENCODING DEVICE

(75) Inventors: Shuji Sotoda, Tokyo (JP); Masahiro Naito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 660 days.

(21) Appl. No.: 09/878,381

(22) Filed: Jun. 12, 2001

(65) Prior Publication Data

US 2002/0011997 A1 Jan. 31, 2002

(30) Foreign Application Priority Data

Jun. 12, 2000 (JP) .................................... P2000-174857

(51) Int. Cl.
*G09G 5/00* (2006.01)

(52) U.S. Cl. ...................... 345/3.1; 345/699; 345/3.3

(58) Field of Classification Search ................. 345/3.1, 345/3.3, 3.4, 690, 699, 204, 506; 348/409, 348/468, 465, 467, 569; 375/240.2, 240.15
See application file for complete search history.

(56) References Cited

U.S. PATENT DOCUMENTS

| | | | |
|---|---|---|---|
| 5,043,919 A | | 8/1991 | Callaway et al. |
| 5,136,695 A | * | 8/1992 | Goldshlag et al. ........... 345/2.1 |
| 5,229,852 A | * | 7/1993 | Maietta et al. ............... 358/140 |
| 5,255,361 A | | 10/1993 | Callaway et al. |
| 5,438,376 A | * | 8/1995 | Watanabe .................... 348/714 |
| 5,557,330 A | * | 9/1996 | Astle ........................ 348/394.1 |
| 5,745,184 A | * | 4/1998 | Neal ............................ 348/468 |
| 5,915,098 A | | 6/1999 | Palmer et al. |
| 6,008,847 A | * | 12/1999 | Bauchspies ............. 375/240.01 |
| 6,157,396 A | | 12/2000 | Margulis et al. |
| 6,201,580 B1 | * | 3/2001 | Voltz et al. .................. 348/584 |
| 6,249,320 B1 | * | 6/2001 | Schneidewend et al. ..... 348/569 |
| 6,304,963 B1 | * | 10/2001 | Elwood ....................... 712/244 |
| 6,344,850 B1 | | 2/2002 | Okumura et al. |
| 6,356,663 B1 | * | 3/2002 | Korta et al. ................. 382/239 |

FOREIGN PATENT DOCUMENTS

| | | |
|---|---|---|
| JP | 2-190926 A | 7/1990 |
| JP | 3-187695 A | 8/1991 |
| JP | 06-319124 A | 11/1994 |
| JP | 7-222173 A | 8/1995 |
| JP | 2000-020031 A | 1/2000 |
| JP | 2000-125301 A | 4/2000 |

* cited by examiner

*Primary Examiner*—Regina Liang
*Assistant Examiner*—Jennifer T. Nguyen
(74) *Attorney, Agent, or Firm*—Birch, Stewart, Kolasch & Birch, LLP

(57) ABSTRACT

The digital image output apparatus comprises a digital image decoder (1a) for decoding encoded digital image data and outputting image data update information (V2); an image data transfer area control unit (7) for determining a portion of the image data which has been updated in encoding according to the image data update information (V2) and outputting a result of the determination (VCT); an image data transfer unit (2a) for transferring digital image data (V1A) from the digital image decoder (1a) to an LCD memory (4) on the basis of the output signal (VCT) from the image data transfer area control unit (7); and the LCD memory (4) for storing the digital image data (V1A). A low-power digital image output apparatus is implemented by transferring image data depending on whether the image data has been updated in encoding of a digital image.

12 Claims, 11 Drawing Sheets

DIRECTION OF PROGRESS OF TIME

DIGITAL IMAGE OUTPUT APPARATUS, DIGITAL IMAGE DECODING DEVICE, AND DIGITAL IMAGE ENCODING DEVICE

BACKGROUND OF THE INVENTION

1. Field of the Invention

The present invention relates to a digital image output apparatus, a digital image decoding device, and a digital image encoding device.

2. Description of the Background Art

FIG. 11 is a block diagram illustrating a configuration of a conventional digital image output apparatus using an LCD (liquid crystal display) as an image display panel. In FIG. 11, reference numeral 1 designates a digital image decoder that receives and decodes a bitstream which is a digital image signal obtained by compression coding of moving image data, and outputs decoded digital image data. Reference numeral 2 designates an image data transfer unit that receives the output digital image data from the digital image decoder 1 and transfers it to an LCD unit 3. The LCD unit 3 displays the digital image data transferred from the image data transfer unit 2.

The LCD unit 3 comprises an LCD memory 4 for storing the received digital image data from the image data transfer unit 2; an LCD driving circuit 5 for retrieving data from the LCD memory 4 and driving an LCD 6; and the LCD 6 for actually displaying the digital image data, all of which are integrally formed.

Next, the operation of the apparatus in FIG. 11 will be set forth. A compressed and encoded bitstream is decoded by the digital image decoder into digital image data. When a bitstream is decoded which has been obtained by encoding of moving image data using an image coding system to split data into macroblocks, which is represented for example by MPEG-2 or MPEG-4, or using an image coding system to perform encoding on a further subdivided block by block basis, the digital image decoder 1 outputs digital image data in blocks. It thus becomes necessary to reconstruct such blocks of digital image data into a single frame of digital image data within the LCD memory 4. FIG. 12 illustrates how such a block-by-block image output is reconstructed into a single frame of digital image data.

Referring to FIG. 12, the digital image decoder 1 outputs blocks of data and the LCD memory or image reconstruction memory 4 starts writing of data from the upper left corner, the writing advancing from left to right and top to bottom, thereby to reconstruct a single frame. For example when the digital image decoder 1 outputs digital image data at 15 frames or images per second (fps), the image reconstruction memory 4 reconstructs 15 images per second.

The image data transfer unit 2 in FIG. 11, when the digital image data is received from the digital image decoder 1, transfers the data to the LCD memory 4 in the LCD unit 3. At this time, when the digital image decoder 1 outputs digital image data at 15 fps, the image data transfer unit 2 transfers digital image data from the digital image decoder 1 to the LCD memory 4 at a rate of 15 times per second.

The LCD memory 4 accumulates digital image data to be output to the LCD 6. The LCD driving circuit 5, in order to drive the LCD 6 for display of an image, retrieves digital image data from the LCD memory 4 for example at a rate of 60 times per second and sends the retrieved data to the LCD 6. The LCD 6 is driven by the LCD driving circuit 5 to display an image.

Next, the digital image coding system represented by MPEG-2 or MPEG-4 will be set forth. It is, however, to be understood that the digital image coding system is not limited to the MPEG-2 and MPEG-4 specifications in accordance with the present invention described later.

FIG. 13 is an explanatory diagram for general predictive coding used in MPEG-2 and MPEG-4, for example. In FIG. 13, the reference numeral 24 designates the current frame now being encoded, which is split into blocks for encoding. The reference numeral 25 designates the current block now being encoded, which is hereinafter referred to as a "block-to-be-encoded". In a predictive coding of the block-to-be-encoded 25, a previous frame 26 is first referred to. More specifically, a block that has a value similar to the block-to-be-encoded 25 is retrieved from surrounding blocks of a corresponding block 27 of the previous frame 26 which is at a position corresponding to the position of the block-to-be-encoded 25. The retrieved block is defined as a reference block 28 and a vector that indicates the relative positions of the reference block 28 and the corresponding block 27 is defined as a motion vector 29. The value of the motion vector 29 and a differential of data between the block-to-be-encoded 25 and the reference block 28 are encoded and transmitted. This method is called predictive coding, which dramatically reduces the amount of encoding as compared to other methods in which predictive coding is not performed.

When the motion vector 29 is 0 and the differential of data between the block-to-be-encoded 25 and the reference block 28 (in this case, the corresponding block 27) is 0, i.e., when the block-to-be-encoded 25 has exactly the same value as the corresponding block 27, a digital image encoding device (encoder) transmits neither the value of the motion vector 29 nor the differential of data to the digital image decoder side. This allows a considerable reduction in the amount of encoding for motionless images.

Looking at such a phenomenon in connection with the digital image decoder 1 in FIG. 11, when neither the motion vector nor the differential of data has been transmitted as a result of decoding of a transmitted code, the digital image decoder 1 regards a block-to-be encoded as having exactly the same value as the corresponding block of the previous frame and thus uses the value of the corresponding block as-is.

When the current frame 24 is exactly the same as the previous frame 26 or when the amount of encoding controlled by the encoder does not permit code transmission, transmission of a single frame of image data may be skipped. This is illustrated in FIG. 14.

FIG. 14 illustrates a frame being skipped. In an ordinary encoding, image data is processed from one frame to another at predetermined time intervals. However, for example when the amount of encoding controlled by the encoder does not permit code transmission, a frame may be skipped. FIG. 14 shows an example of such a frame 30 being skipped without encoding. When a single frame is skipped during transmission of images (frames) at a frame rate of 15 fps, image data for 14 frames will be transmitted in a one second period. In this case, the decoder side regards the skipped frame as being the same as the immediately preceding frame; therefore, the digital image decoder 1 in FIG. 11 outputs the same image data as the immediately preceding frame once again.

Next, assuming that the conventional digital image output apparatus is used in video telephones implemented in cellular phones, the relationship between image decoding and the digital image output apparatus will be set forth.

Images transmitted by video telephones are mainly face images. FIG. 15 is an explanatory diagram for a typical face image transmitted by a video telephone. In FIG. 15, the reference numeral 31 designates a whole face image. The face image 31 consists of a diagonally-shaded figure part 32 and the other background part 33.

In the face image 31, the figure part 32 relatively changes but the background part 33 often remains unchanged. That is, for the background part 33, as has been previously described in connection with predictive coding, neither the motion vector nor the differential of data is transmitted from the encoder side to the decoder side and consequently, the decoder side often uses the value of a previous corresponding block as-is.

When there is no change in the figure part 32, the whole face image 31 may not be changed at all. In this case, a whole frame may be skipped as has been previously described in connection with predictive coding.

Looking at such phenomena in connection with the conventional digital image output apparatus in FIG. 11, the digital image decoder 1 outputs image data at predetermined intervals, e.g., at 15 fps, regardless of whether the block has been updated or the frame has been skipped. Thus, for example when one frame is skipped, the digital image decoder 1 outputs the same frame of image data twice.

When a certain block in a certain frame has not been updated, a block of image data in the LCD memory 4 which is at a position corresponding to the position of the certain block is overwritten with a block of image data that has exactly the same value as the image data for a corresponding block of the immediately preceding frame in the LCD memory 4. When a whole frame has not been updated, the whole image data in the LCD memory 4 is overwritten with a frame of image data that has exactly the same value as the image data for the immediately preceding frame in the LCD memory 4.

SUMMARY OF THE INVENTION

A first aspect of the present invention is directed to a digital image decoding device comprising: a first portion receiving encoded digital image data; a second portion connected to the first portion and decoding the encoded digital image data to output decoded digital image data; and a third portion connected to the first portion and generating image data update information which provides information about whether digital image data has been updated in encoding, based on the encoded digital image data to output the image data update information.

According to a second aspect of the present invention, in the digital image decoding device of the first aspect, the image data update information is either block-by-block update information, each block constituting part of an image, or frame-by-frame update information.

According to a third aspect of the present invention, in the digital image decoding device of the first aspect, the image data update information includes both block-by-block update information, each block constituting part of an image, and frame-by-frame update information.

A fourth aspect of the present invention is directed to a digital image output apparatus comprising: the digital image decoding device of either of the first through third aspects; a digital image data transfer device connected to the digital image decoding device and identifying an updated portion of the decoded digital image data outputted from the digital image decoding device based on the image data update information outputted from the digital image decoding device, the updated portion having been updated in encoding, thereby to transfer only the updated portion of the decoded digital image data as a result of the identification; and a digital image data storage device connected to the digital image data transfer device and storing the decoded digital image data transferred and outputted from the digital image data transfer device.

According to a fifth aspect of the present invention, in the digital image output apparatus of the fourth aspect, the digital image data transfer device comprises: an image data transfer area control unit connected to the digital image decoding device and identifying the updated portion based on the image data update information, thereby to output a transfer control signal as a result of the identification; and an image data transfer unit connected to the digital image decoding device, the image data transfer area control unit, and the digital image data storage device, and on the basis of the transfer control signal, transferring only the updated portion of the decoded digital image data outputted from the digital image decoding device, to the digital image data storage device.

According to a sixth aspect of the present invention, in the digital image output apparatus of the fourth aspect, the digital image data transfer device comprises: an image data transfer area control unit connected to the digital image decoding device, identifying the updated portion based on the image data update information, and outputting a transfer control signal as a result of the identification; an image reconstruction data storage unit connected to the digital image decoding device and reconstructing a single image from the decoded digital image data outputted from the digital image decoding device; and an image data transfer unit connected to the image reconstruction data storage unit, the image data transfer area control unit, and the digital image data storage device, and on the basis of the transfer control signal, retrieving digital image data corresponding only to the updated portion from the image reconstruction data storage unit to transfer it to the digital image data storage device.

According to a seventh aspect of the present invention, in the digital image output apparatus of the fourth aspect, the digital image data transfer device comprises: an image data transfer area control unit connected to the digital image decoding device, identifying the updated portion based on the image data update information, and outputting a transfer control signal as a result of the identification; a first image data transfer unit connected to both the digital image decoding device and the image data transfer area control unit, and on the basis of the transfer control signal, transferring only the updated portion of the decoded digital image data outputted from the digital image decoding device; an image reconstruction data storage unit connected to the first image data transfer unit and reconstructing a single image from the updated portion of the decoded digital image data outputted from the first image data transfer unit; and a second image data transfer unit connected to the image reconstruction data storage unit, the image data transfer area control unit, and the digital image data storage device, and on the basis of the transfer control signal, retrieving digital image data corresponding only to the updated portion from the image reconstruction data storage unit to transfer it to the digital image data storage device.

An eighth aspect of the present invention is directed to a digital image encoding device for encoding digital image data to output monitor image data for monitoring of an encoded image and outputting monitor image data update information which provides information about whether the digital image data has been updated in encoding.

According to a ninth aspect of the present invention, in the digital image encoding device of the eight aspect, the monitor image data update information is either block-by-block update information, each block constituting part of an image, or frame-by-frame update information.

According to a tenth aspect of the present invention, in the digital image encoding device of the ninth aspect, the monitor image data update information includes both block-by-block update information, each block constituting part of an image, and frame-by-frame update information.

An eleventh aspect of the present invention is directed to a digital image output apparatus comprising: the digital image encoding device of either of the eighth through tenth aspects; a monitor image data transfer device configured to identify an updated portion of the monitor image data outputted from the digital image encoding device based on the monitor image data update information outputted from the digital image encoding device, the updated portion having been updated in encoding, and to transfer only the updated portion of the monitor image data as a result of the identification; and a monitor image data storage device configured to store the monitor image data transferred and outputted from the monitor image data transfer device.

According to a twelfth aspect of the present invention, in the digital image output apparatus of the eleventh aspect, the monitor image data transfer device comprises: an image data transfer area control unit configured to identify the updated portion based on the monitor image data update information and to output a transfer control signal as a result of the identification; and an image data transfer unit configured to, on the basis of the transfer control signal, transfer only the updated portion of the monitor image data outputted from the digital image encoding device, to the monitor image data storage device.

According to a thirteenth aspect of the present invention, in the digital image output apparatus of the eleventh aspect, the monitor image data transfer device comprises: an image data transfer area control unit configured to identify the updated portion based on the monitor image data update information and to output a transfer control signal as a result of the identification; an image reconstruction data storage unit configured to reconstruct a single image from the monitor image data outputted from the digital image encoding device; and an image data transfer unit configured to, on the basis of the transfer control signal, retrieve monitor image data corresponding only to the updated portion from the image reconstruction data storage unit and to transfer it to the monitor image data storage device.

According to a fourteenth aspect of the present invention, in the digital image output apparatus of the eleventh aspect, the monitor image data transfer device comprises: an image data transfer area control unit configured to identify the updated portion based on the monitor image data update information and to output a transfer control signal as a result of the identification; a first image data transfer unit configured to, on the basis of the transfer control signal, transfer only the updated portion of the monitor image data outputted from the digital image encoding device; an image reconstruction data storage unit configured to reconstruct a single image from the updated portion of the monitor image data outputted from the first image data transfer unit; and a second image data transfer unit configured to, on the basis of the transfer control signal, retrieve monitor image data corresponding only to the updated portion from the image reconstruction data storage unit and to transfer it to the monitor image data storage device.

With the aforementioned configuration, the present invention brings about the following effects.

The first aspect of the present invention makes implementable the digital image output apparatus that achieves a reduction in needless power consumption.

The second aspect of the present invention permits either block-by-block or frame-by-frame control.

The third aspect of the present invention permits both block-by-block and frame-by-frame control.

The fourth through seventh aspects of the present invention avoid a needless transfer operation and reduce power consumption, as compared with conventional apparatuses in which all image data is transferred.

The eighth aspect of the present invention makes implementable the digital image output apparatus that achieves a reduction in needless power consumption.

The ninth aspect of the present invention permits either block-by-block or frame-by-frame control.

The tenth aspect of the present invention permits both block-by-block and frame-by-frame control.

The eleventh through fourteenth aspects of the present invention effectively avoid a needless transfer operation and reduce power consumption, as compared with conventional apparatuses in which all monitor image data is transferred from the digital image encoding device at the time of output, transfer, and storage.

An object of the present invention is to provide a low-power digital image output apparatus that performs decoding and transmission of digital image data depending on whether the image data has been updated at the stage of encoding.

These and other objects, features, aspects and advantages of the present invention will become more apparent from the following detailed description of the present invention when taken in conjunction with the accompanying drawings.

DESCRIPTION OF THE PREFERRED EMBODIMENTS

As above described, with no information about the update status of each block of image data or of each single frame of image data, the conventional image data transfer unit always transfers a whole frame of image data at predetermined intervals, e.g., at a rate of 15 times per second, from the digital image decoder to the LCD memory regardless of whether the image data has been updated.

In the conventional digital image output apparatus, therefore, image data which does not need transfer when the block has not been updated or the frame has been skipped at the stage of compression coding of moving images, is also transferred as is the case for ordinary image data, which results in the occurrence of needless operations.

Especially for battery-powered equipment such as cellular phones, minimization of power consumption is an important issue. In this regard, the above needless operations require needless power consumption.

A similar problem also arises in the digital image encoding device when generating monitor image data by means of its local decoder and transferring it to an image display panel memory.

Hereinbelow, preferred embodiments of the present invention will be set forth in detail with reference to the drawings.

(First Preferred Embodiment)

Figure 1:
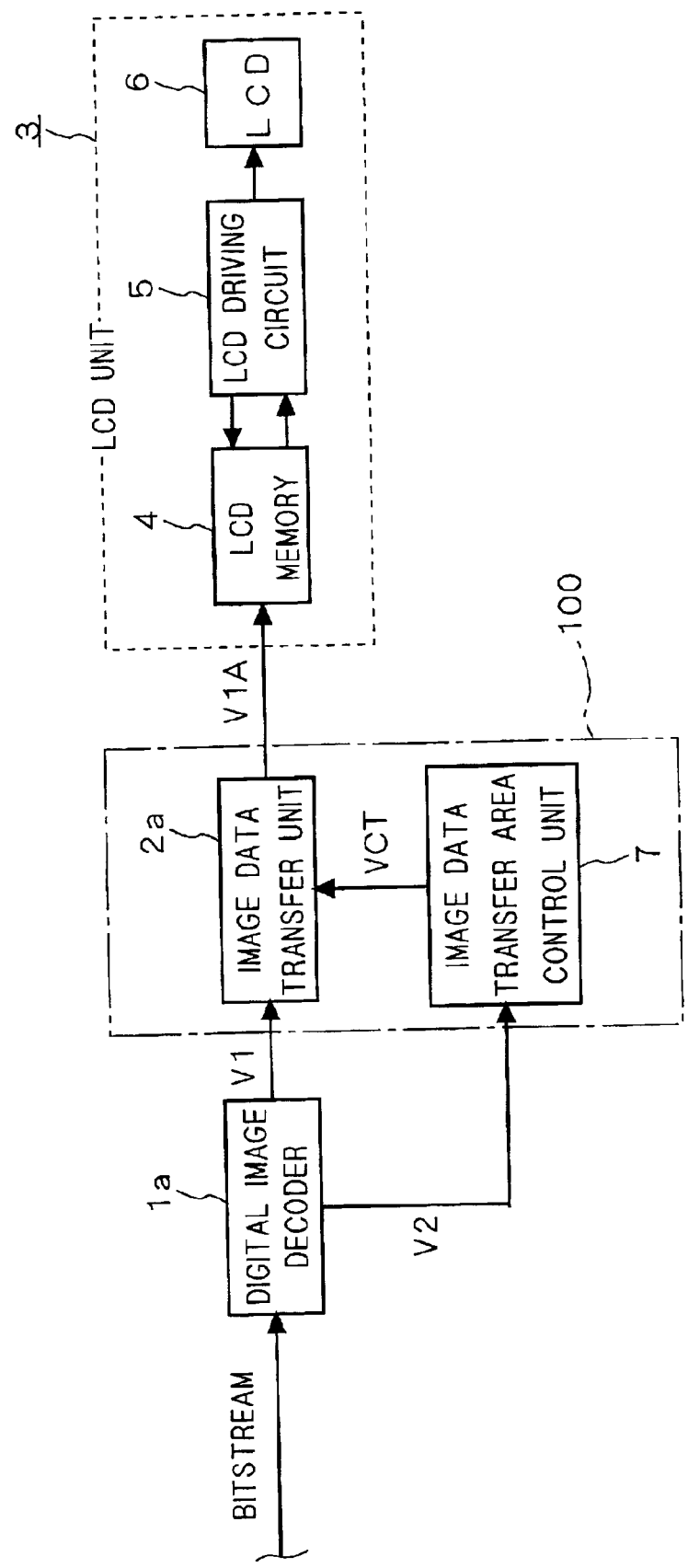
FIG. 1 is a block diagram of a first preferred embodiment of the present invention.

FIG. 1 is a block diagram illustrating a configuration of a digital image output apparatus according to a first preferred embodiment of the present invention. In FIG. 1, reference character 1a designates a digital image decoder (also referred to as a digital image decoding device) that receives and decodes a bitstream (equivalent to encoded digital image data), which is a digital signal obtained by compression coding of moving images by an encoding device (not shown) provided outside the apparatus, and outputs decoded digital image data V1. The digital image decoder 1a, on the basis of the received bitstream or code, also generates and outputs an image data update information signal (hereinafter referred to as merely as "image data update information") V2 that provides information about whether the image data has been updated in encoding. Reference numeral 7 designates an image data transfer area control unit that receives the image data update information or control data V2 which is a second output signal from the digital image decoder 1a, identifies a portion of image data which has been updated in encoding (from the opposite viewpoint, a portion which has not been updated) according to the information V2, and outputs a transfer control signal VCT as a result of the identification for control of an image data transfer unit 2a. The image data transfer unit 2a receives the digital image data V1 which is a first output signal from the digital image decoder 1a and the transfer control signal VCT, extracts only an updated portion V1A of the digital image data or first output signal V1 on the basis of the transfer control signal VCT, and outputs the data V1A to an LCD memory or digital image data storage device 4. A digital image data transfer device 100 comprising the units 7 and 2a has the function of identifying a portion of image data which has been updated in encoding (hereinafter referred to as an "updated portion") or, in other words, a portion which has not been updated (hereinafter referred to as a "not-updated portion") according to the image data update information V2 and transferring and outputting only the updated portion V1A of the digital image data V1 based on a result of the identification (the digital image data corresponding only to the updated portion is equivalent to the portion V1A itself.)

Reference numeral 3 designates an LCD unit for displaying the digital image data V1A transferred from the image data transfer unit 2a. The LCD unit 3 comprises the LCD memory (storage unit) 4 for storing the digital image data V1A transmitted from the image data transfer unit 2a, an LCD driving curcuit 5 for retrieving date from the LCD memory 4 and driving an LCD 6, and the LCD 6 for actually displaying the digital image data, all of which are integrally formed.

Next, the operation of the digital image output apparatus in FIG. 1 will be set forth. When an encoded bitstream is received as an input signal, the digital image decoder 1a outputs the decoded digital image data V1 as a first output signal and also outputs the image data update information V2 about the digital image data V1 as a second output signal to the image data transfer area control unit 7.

Figure 13:
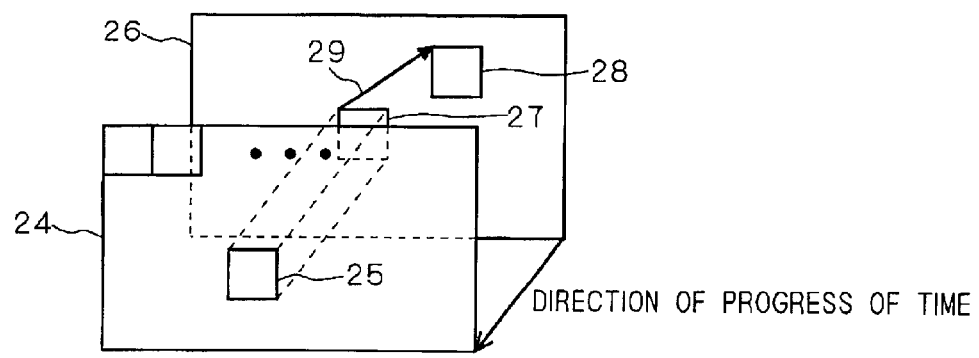
FIG. 13 illustrates predictive coding.

Now, the image data update information or second output signal V2 from the digital image decoder 1a will be set forth. First, a block-by-block update information, each block constituting part of an image, will be discussed. In a predictive coding on a block by block basis as shown in FIG. 13, when the motion vector 29 is 0 and the differential between the block-to-be-encoded 25 and the reference block 28 (in this case, the corresponding block 27) is 0, a digital image encoding device (not shown) does not perform encoding of image data for the block-to-be-encoded 25. Thus, the image data for the block-to-be-encoded 25 is not updated. At this time, the digital image decoder 1a detects the absence of the image data for the block-to-be-encoded 25, thereby regarding the block-to-be-encoded 25 as a block whose image data has not been updated in encoding (hereinafter referred to as a "not-updated block-to-be-encoded") and then outputs data for a corresponding block in the previous frame information which is at a position corresponding to the position of the block-to-be-encoded 25 (in FIG. 13, data for the corresponding block 27) as digital image data V1 for the block-to-be-encoded 25. At the same time as the output of the digital image data V1 for the block-to-be-encoded 25 or at a certain time after the completion of that output, the digital image decoder 1a also outputs a signal that enables identification of such a not-updated block-to-be-encoded 25 in one way or another, as the image data update information V2. For example, where each one frame shall be split into m by n blocks and the leftmost block in the top row is represented by (0, 0), each block is numbered (i, j) ($0 \leq i \leq m-1, 0 \leq j \leq n-1$) with a first coordinate i incremented by 1 from left to right and a second coordinate j incremented by 1 from top to bottom. In the case of FIG. 13, for example if the not-updated block-to-be-encoded 25 is the second block from the left and the third block from the top and is thus represented by (1, 2), the digital image decoder 1a encodes and outputs this number (1, 2) as the image data update information V2. This permits the identification of the not-updated block-to-be-encoded 25. Conversely, a block-to-be-encoded, the number of which is not included in the image data update information V2, can be regarded as a block whose image data has been updated in encoding (hereinafter referred to as an "updated block-to-be-encoded"). When there are a plurality of not-updated blocks-to-be-encoded, the digital image decoder 1a outputs the numbers of all such blocks.

Figure 12:
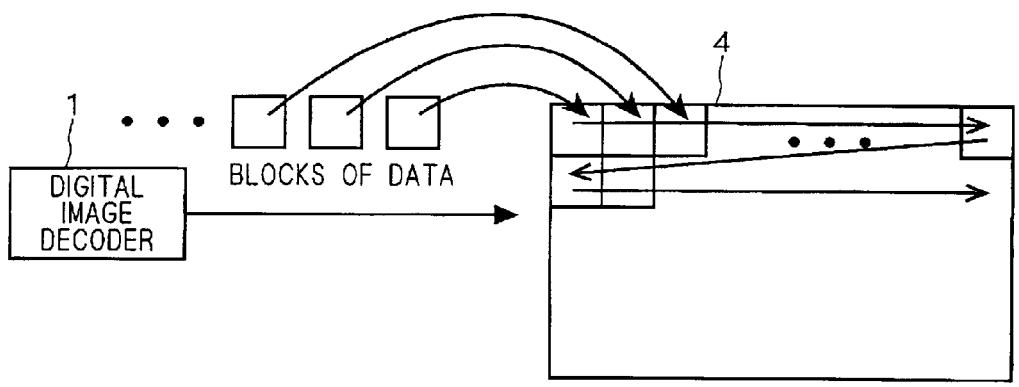
FIG. 12 shows how block-by-block image output is reconstructed into a frame of image data.

It is also possible to identify a not-updated or updated block-to-be-encoded in the following manner. When as shown in FIG. 12, the digital image decoder 1a outputs the digital image data or first output signal V1 on a block by block basis, the digital image decoder 1a may identify a not-updated block-to-be-encoded by generating and outputting a signal for indicating that the block-to-be-encoded has not been updated in encoding, as the image data update information V2 in proper timed relation with the output of the digital image data V1 for that not-updated block-to-be-encoded. For example, upon output of the first output signal V1 for a not-updated block-to-be-encoded, the digital image decoder 1a outputs "1" as the image data update information V2, while upon output of the first output signal V1 for an updated block-to-be-encoded, the digital image decoder 1a outputs "0" as the image data update information V2. In this case, a not-updated block-to-be-encoded can be identified by a signal of "1". It goes without saying that the above definition of "1" and "0" may be reversed.

In another alternative, the digital image decoder 1a may output only decoded digital image data for an updated block-to-be-encoded, as the first output signal or digital image data V1 and outputs a signal for indicating a not-updated block-to-be-encoded, i.e., a signal for identification of a block-to-be-encoded which does not have the corresponding first output signal V1 from the decoder 1a, as the second output signal V2. At this time, the image data update information V2 is provided for example as a signal obtained by encoding the aforementioned block number (i, j).

Figure 14:
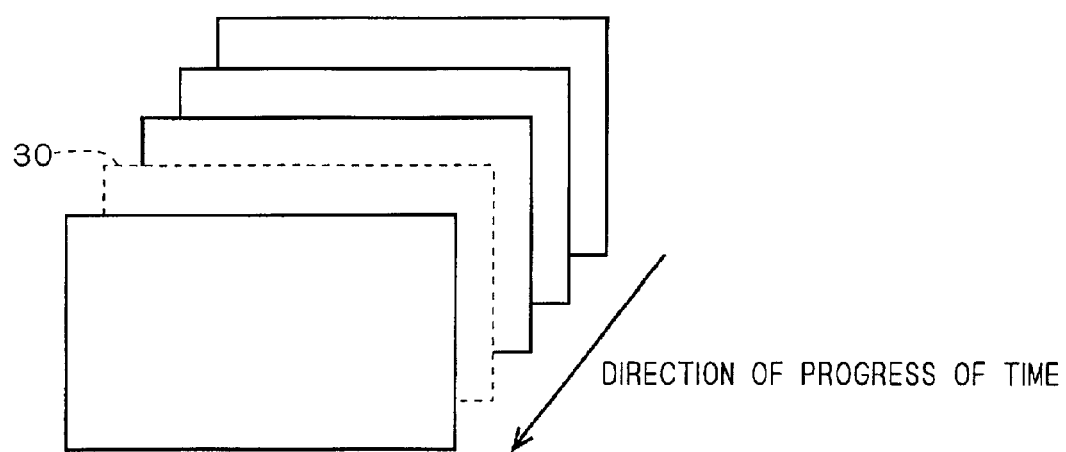
FIG. 14 illustrates frame skipping.

Next, a frame-by-frame update information will be discussed. For example when the whole image data for the frame 30 has not been updated in encoding as a result of skipping of the frame 30 as shown in FIG. 14, the digital image decoder 1a outputs a signal that enables identification of the frame 30 in one way or another, as the image data update information V2. More specifically, (1) as in the block-by-block update information, each frame is numbered and a signal obtained by encoding the number of each not-updated frame is outputted as the image data update information V2 or, (2) in proper timed relation with output of the whole decoded digital image data V1 for a single frame, a signal for indicating that the frame being outputted has not been updated is outputted as the image data update information V2.

Alternatively, it is also possible to output both the block-by-block update information and the frame-by-frame update information as the image data update information V2. This permits more precise control.

The image data transfer area control unit 7 in FIG. 1 identifies which portion of the digital image data or first output signal V1 from the digital image decoder 1a has not been updated according to the second output signal or image data update information V2 from the digital image decoder 1a. For example when the image data update information V2 is represented by a block or frame number, the control unit 7 interprets the number in the information V2 to identify a not-updated block or frame (in other words, an updated block or frame). The control unit 7 then transmits the transfer control signal VCT (information for identification of the updated block or frame) as a result of the interpretation to the image data transfer unit 2a.

On the basis of the transfer control signal VCT (the result of the identification of the updated portion) from the image data transfer area control unit 7, the image data transfer unit 2a extracts only the updated portion V1A of the output digital image data V1 from the digital image decoder 1a and transfers only the data V1A to the LCD memory 4.

The LCD driving circuit 5, in order to drive the LCD 6 for display of an image, retrieves digital image data from the LCD memory 4 for example at a rate of 60 times per second and transfers the retrieved data to the LCD 6. The LCD 6 is driven by the LCD driving circuit 5 to display a desired image. In this point, the apparatus of this preferred embodiment is identical to the conventional apparatus shown in FIG. 11.

According to this preferred embodiment, the image data transfer unit 2a, on the basis of the output signal VCT from the image data transfer area control unit 7, transfers only the updated portion V1A, which has been updated in encoding of the digital image data V1 from the digital image decoder 1a, to the LCD memory 4. Therefore, as compared with conventional apparatuses in which all the digital image data V1 is transferred as-is from the digital image decoder 1 to the LCD memory 4, this apparatus can avoid a needless transfer operation to transfer exactly the same data as has been previously stored in the LCD memory 4 and to overwrite data stored at a corresponding location in the LCD memory 4 with the transferred data. This achieves a reduction in power consumption.

While in the above description of this preferred embodiment, the image data update information V2 is a signal for identification of a not-updated block or frame, conversely, the image data update information V2 may be provided for identification of an updated block or frame. In this regard, the image data update information V2 can be said to be information about whether image data has been updated in encoding.

Further, the image data update information V2 is not limited to the block-by-block or frame-by-frame update information but when a frame image consists of rectangular regions each consisting of a plurality of blocks, or consists of fields, or is made with a layered structure, it should only indicate whether a specific area in an image or specific part in a sequence of image information, such as a specific rectangular region, a specific field or a specific layer, has been updated.

A final image output unit in this preferred embodiment is the LCD 3 but it is not limited thereto. In brief, the final image output unit may be any other unit as long as it includes an image data storage unit for image output. For example, it can be an image display device using light emitters (such as a plasma display device, an organic EL display device, or a field emission display device). Further, since the units 1a, 7, 2a, and 4 in FIG. 1 form the heart of the apparatus of this preferred embodiment, the final stage of this apparatus does not have to be an image display panel (such as the LCD 6) but may be an image data storage unit or a transfer unit, for example.

(Second Preferred Embodiment)

Figure 11:
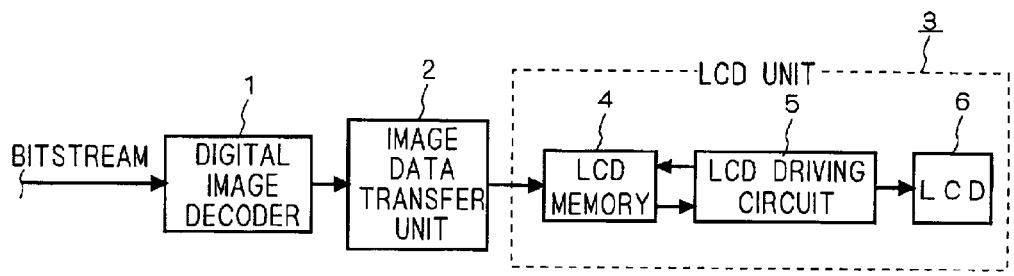
FIG. 11 is a diagram of a conventional digital image output apparatus.

In this preferred embodiment, an image reconstruction memory 8 in which computer graphics data or the like is superimposed on decoded digital image data to reconstruct a single image is inserted between the digital image decoder 1 and the image data transfer unit 2 in the conventional apparatus shown in FIG. 11. That is, the technical feature of the first preferred embodiment is applied to the conventional apparatus having the memory 8.

Figure 2:
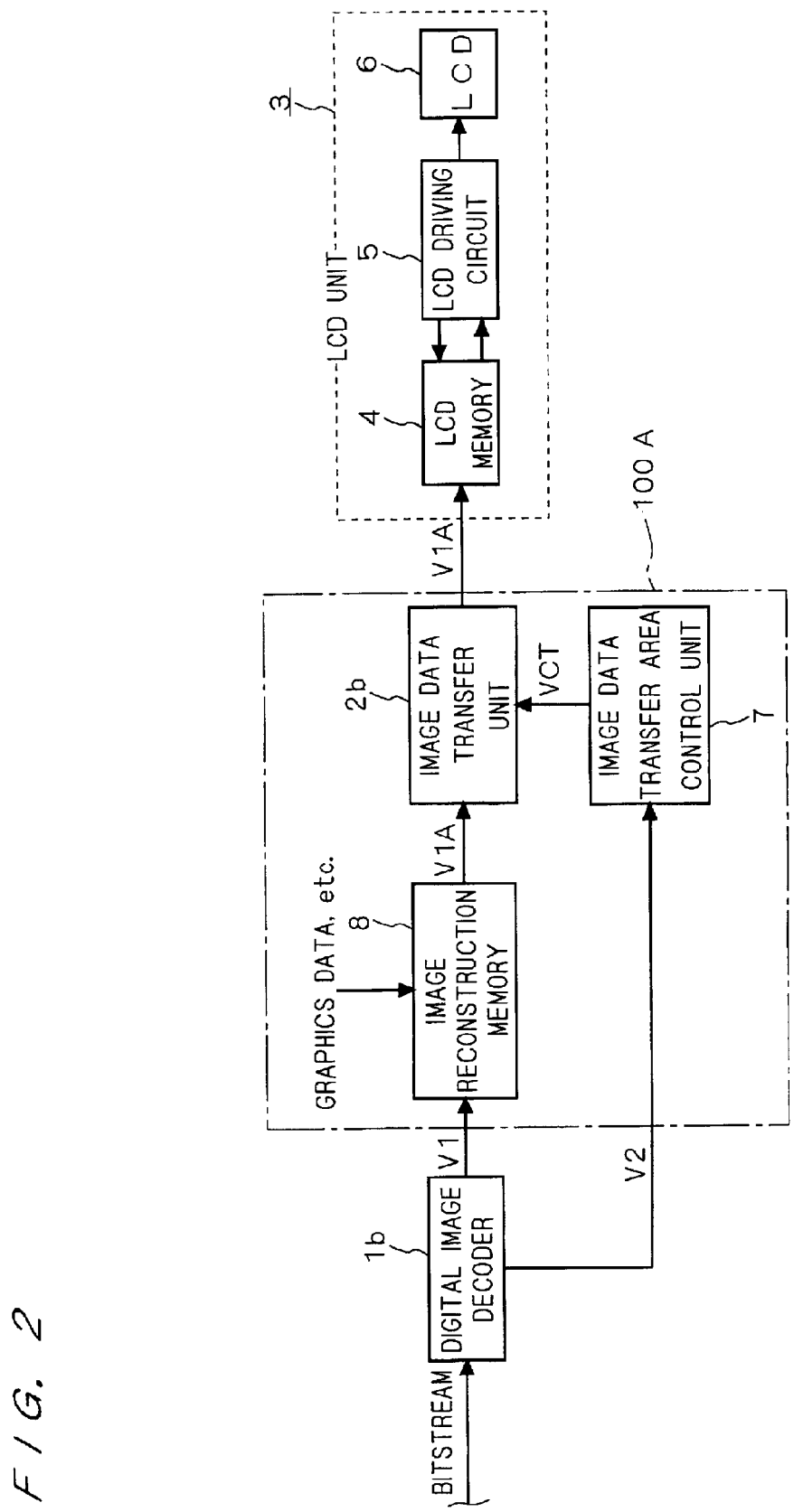
FIG. 2 is a block diagram of a second preferred embodiment of the present invention.

FIG. 2 is a block diagram illustrating a configuration of a digital image output apparatus according to a second preferred embodiment of the present invention. In FIG. 2, a circuit 100A has the same function as the circuit 100 of FIG. 1. Reference numeral 1b designates a digital image decoder that decodes a bitstream which is a compressed digital signal, the decoder 1b having the same function as the digital image decoder 1a of FIG. 1. The memory 8 is an image reconstruction data storage unit for reconstructing a single digital image by superimposing a static image such as graphics data on the first output signal V1 from the digital image decoder 1b. Reference numeral 7 designates an image data transfer area control unit for identifying an updated portion of image data according to update information given by the second output signal V2 from the digital image decoder 1b and outputting the transfer control signal VCT as a result of the identification for control of an image data transfer unit 2b, the control unit 7 being equivalent to that of FIG. 1. The image data transfer unit 2b, which is equivalent to the image data transfer unit 2a of FIG. 1, retrieves digital image data corresponding only to the updated portion from the image reconstruction memory 8 under instructions from the image data transfer area control unit 7 and transfers it to the LCD memory 4.

Reference numeral 3 designates an LCD unit for display of the digital image data V1A transferred from the image data transfer unit 2b. The LCD unit 3 comprises the LCD memory 4 for storing the digital image data V1A transmitted from the image data transfer unit 2b, the LCD driving circuit 5 for retrieving data from the LCD memory 4 and driving the LCD 6, and the LCD 6 for actually displaying the image data, all of which are integrally formed.

Next, the operation of the apparatus will be set forth. The digital image decoder 1b, when a bitstream is received as an input signal, outputs all the decoded digital image data V1 as a first output signal to the image reconstruction memory 8 regardless of whether the image data on a block by block or frame by frame basis has been updated in encoding, and also outputs update information about the digital image data V1 as a second output signal V2 to the image data transfer area control unit 7.

Herein, since the image data update information or second output signal V2 from the digital image data 1b is identical in content to that described in the first preferred embodiment and thus the description thereof will be omitted.

Figure 15:
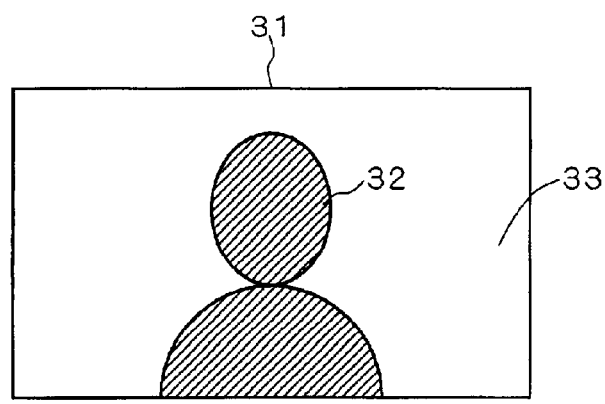
FIG. 15 is a diagram for a typical face image transmitted by a video telephone.

The image reconstruction memory 8 stores the digital image data or first output signal V1 from the digital image decoder 1b at a predetermined storage location, and superimposes a static image such as graphics data, or other moving image data on the digital image data V1 stored therein to reconstruct a single image. The static image such as graphics data here is for example a static image transmitted from the CPU or the like, or image data describing characters. The moving image data is, for example in the case of a video telephone, monitor images transmitted from a digital image encoding device. More specifically, taking the face image 31 of FIG. 15 as an example, a single frame is reconstructed such that small monitor images of a user's face will show up in the corner of the background part 33. In such a case, the superimposed moving image data is different from that for the immediately preceding frame stored in a corresponding location in the LCD memory 4. Thus, the superimposed moving image data stored in the image reconstruction memory 8 is separately retrieved and transferred by the image data transfer unit 2b to the LCD memory 4, regardless of the transfer control signal VCT.

The image data transfer area control unit 7 identifies which portion of the digital image data V1 stored in the image reconstruction memory 8 corresponds to a not-updated portion according to the second output signal or image data update information V2 from the digital image decoder 1b. The control unit 7 then outputs the transfer control signal VCT (information for identification of the updated portion) as a result of the identification to the image data transfer unit 2b.

The image data transfer unit 2b, on the basis of the output signal VCT from the image data transfer area control unit 7, retrieves the digital image data V1A corresponding only to the updated portion of the digital image data V1 from the image reconstruction memory 8, and transfers the data V1A to the LCD memory 4.

The LCD driving circuit 5, in order to drive the LCD 6 for display of an image, retrieves digital image data from the LCD memory 4 for example at a rate of 60 times per second and transfers it to the LCD 6. The LCD 6 is driven by the LCD driving circuit 5 to display an image.

According to this preferred embodiment as described above, the image data transfer unit 2b transfers only the updated portion of the digital image data stored in the image reconstruction memory 8 to the LCD memory 4 depending on the output from the image data transfer area control unit 7. Therefore, as compared with conventional apparatuses in which all reconstructed digital image data is transferred as-is after graphics or the like is superimposed on the decoded moving images from the digital image decoder 1b with the intervention of the image reconstruction memory 8, this apparatus can avoid a needless transfer operation to transfer exactly the same data as has been previously stored in the LCD memory 4 and to overwrite data stored at a corresponding location in the LCD memory 4 with the transferred data. This achieves a reduction in power consumption.

While in this preferred embodiment, the image data update information V2 is used to identify a not-updated block or frame, it may be used to identify an updated block or frame.

Further, the image data update information V2 is not limited to block-by-block or frame-by-frame update information but when a frame image consists of rectangular regions each consisting of a plurality of blocks, or consists of fields, or is made with a layered structure, the update information V2 should only indicate whether a specific area in an image or specific part in a sequence of image information, such as a specific layer, has been updated.

A final image output unit in this preferred embodiment is the LCD unit 3 but it is not limited thereto. In fact, the final image output unit may be any image output unit that includes an image data storage unit for image output. For example, it can be an image display device using light emitters. Further, the final stage of this apparatus does not have to be the LCD 6 but may be an image data storage unit or a transfer unit.

(Third Preferred Embodiment)

This preferred embodiment represents an improvement on the second preferred embodiment and is characterized in that an equivalent of the image data transfer unit 2a of the first preferred embodiment shown in FIG. 1 is inserted between the digital image decoder and the image reconstruction memory.

Figure 3:
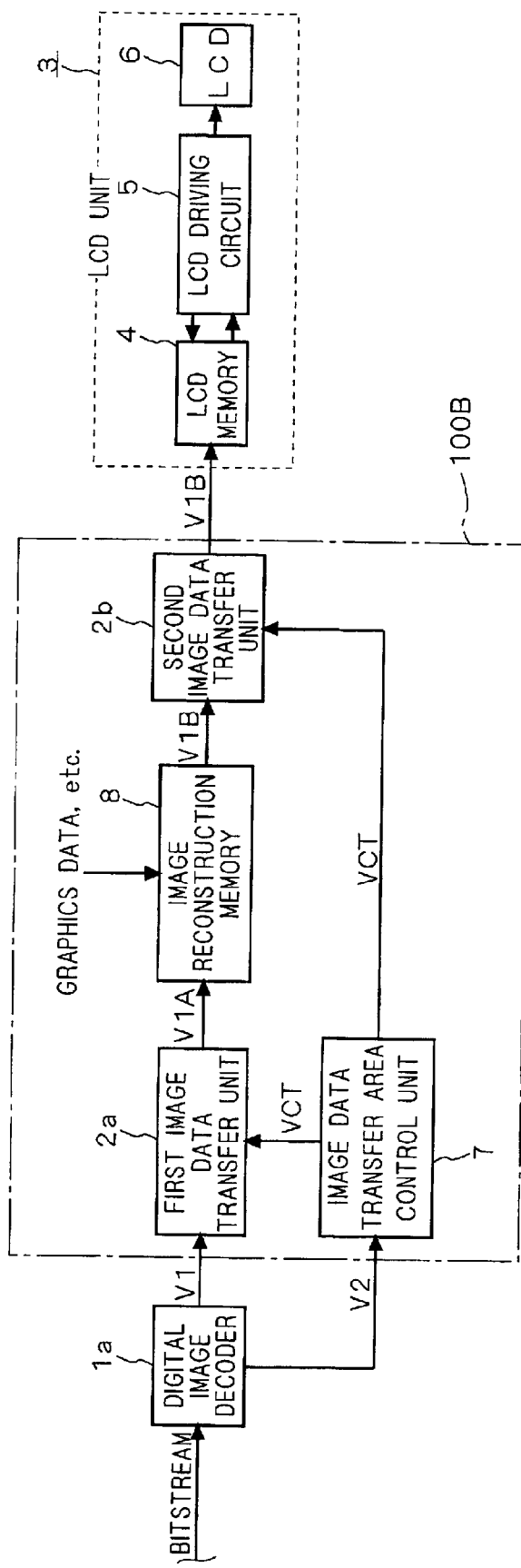
FIG. 3 is a block diagram of a third preferred embodiment of the present invention.

FIG. 3 illustrates a digital image output apparatus according to a third preferred embodiment of the present invention. In FIG. 3, the reference numeral 1a designates a digital image decoder that decodes a bitstream which is a compressed digital signal, the decoder 1a being equivalent to the decoders 1a and 1b shown in FIGS. 1 and 2. Reference numeral 7 designates an image data transfer area control unit for identifying an updated portion according to update information given by the second output signal V2 from the digital image decoder 1a and outputting the transfer control signal VCT as a result of the identification for control of a first image data transfer unit 2a and a second image data transfer unit 2b. The control unit 7 is substantially equivalent to those shown in FIGS. 1 and 2. The first image data transfer unit 2a is basically equivalent to the unit 2a of FIG. 1, which transfers only the updated portion V1A of the first output signal or digital image data V1 from the digital image decoder 1a to the image reconstruction memory 8 on the basis of the transfer control signal VCT from the image data transfer area control unit 7. The image reconstruction memory 8 is an image reconstruction data storage unit for reconstructing a single digital image from graphics data or the like and the output signal V1A from the first image data transfer unit 2a. The second image data transfer unit 2b retrieves digital image data V1B corresponding only to the updated portion V1A from the image reconstruction memory 8 on the basis of the transfer control signal VCT from the image data transfer area control unit 7, and transfers the retrieved data V1B to the LCD memory 4. Reference numeral 3 designates an LCD unit for display of the digital image data V1B transferred from the second image data transfer unit 2b. The LCD unit 3 comprises the LCD memory 4 for storing the digital image data V1B transmitted from the second image data transfer unit 2b, the LCD driving circuit 5 for retrieving data from the LCD memory 4 and driving the LCD 6, and the LCD 6 for actually displaying the image data, all of which are integrally formed. A circuit 100B has the same function as the circuit 100 of FIG. 1 and the circuit 100A of FIG. 2, which identifies the updated portion according to the image data update information V2 and transfers only the updated portion of the digital image data V1 according to a result of the identification.

Next, the operation of this output apparatus will be set forth. The digital image decoder 1a, when a bitstream is received as an input signal, outputs the digital image data V1 as a first output signal and also outputs update information about the digital image data V1 as a second output signal V2 to the image data transfer area control unit 7.

The second output signal or image data update information V2 from the digital image decoder 1a is identical to those described in the first and second preferred embodiment.

As in the first preferred embodiment, the digital image decoder 1a may output only digital image data for an updated block-to-be-encoded as the first output signal or digital image data V1 and output a signal for identification of a not-updated block-to-be-encoded as the second output signal V2.

The image data transfer area control unit 7 identifies which portion of the digital image data or first output signal V1 from the digital image decoder 1a has not been updated according to the image data update information V2 from the digital image decoder 1a, and transmits the transfer control signal VCT as a result of the identification of the updated portion to the first and second image data transfer units 2a and 2b.

The first image data transfer unit 2a, on the basis of the output signal VCT from the image data transfer area control unit 7, transfers only the updated portion V1A of the digital image data V1 to the image reconstruction memory 8.

The image reconstruction memory 8 superimposes a static image such as graphics data, or other moving image data on the output signal or digital image data V1A from the first image data transfer unit 2a, thereby to reconstruct a single image.

The second image data transfer unit 2b, on the basis of the output signal VCT from the image data transfer area control unit 7, retrieves the digital image data V1B which corresponds only to the updated portion of the digital image data stored in the image reconstruction memory 8, and transfers it to the LCD memory 4.

The LCD driving circuit 5, in order to drive the LCD 6 for display of an image, retrieves digital image data from the LCD memory 4 for example at a rate of 60 times per second and transfers it to the LCD 6. The LCD 6 is driven by the LCD driving circuit 5 to display an image.

According to this preferred embodiment, the first image data transfer unit 2a transfers only the updated portion V1A of the digital image data or first output signal V1 from the digital image decoder 1a to the image reconstruction memory 8 on the basis of the output signal VCT from the image data transfer area control unit 7. Besides, the second image data transfer unit 2b transfers the digital image data V1B which corresponds only to the updated portion of the digital image data stored in the image reconstruction memory 8, to the LCD memory 4. Therefore, the apparatus can simultaneously avoid a needless transfer operation to transfer exactly the same data as has been previously stored in the image reconstruction memory 8 and to overwrite corresponding part of the memory 8 with the transferred data, and a needless transfer operation to transfer exactly the same data as has been previously stored in the LCD memory 4 and to overwrite corresponding part of the LCD memory 4 with the transferred data. This achieves a further reduction in power consumption.

While in this preferred embodiment, the image data update information V2 is used to identify a not-updated block or frame, it may be used to identify an updated block or frame.

Further, the image data update information is not limited to the block-by-block or frame-by-frame update information but it should only indicate whether a specific area in an image or specific part in a sequence of image information, such as a field or a rectangular region consisting of a plurality of blocks, has been updated.

A final image output unit in this preferred embodiment is the LCD unit 3 but it is not limited thereto. In fact it may be any image output unit that includes an image data storage unit for image output.

(Fourth Preferred Embodiment)

Figure 4:
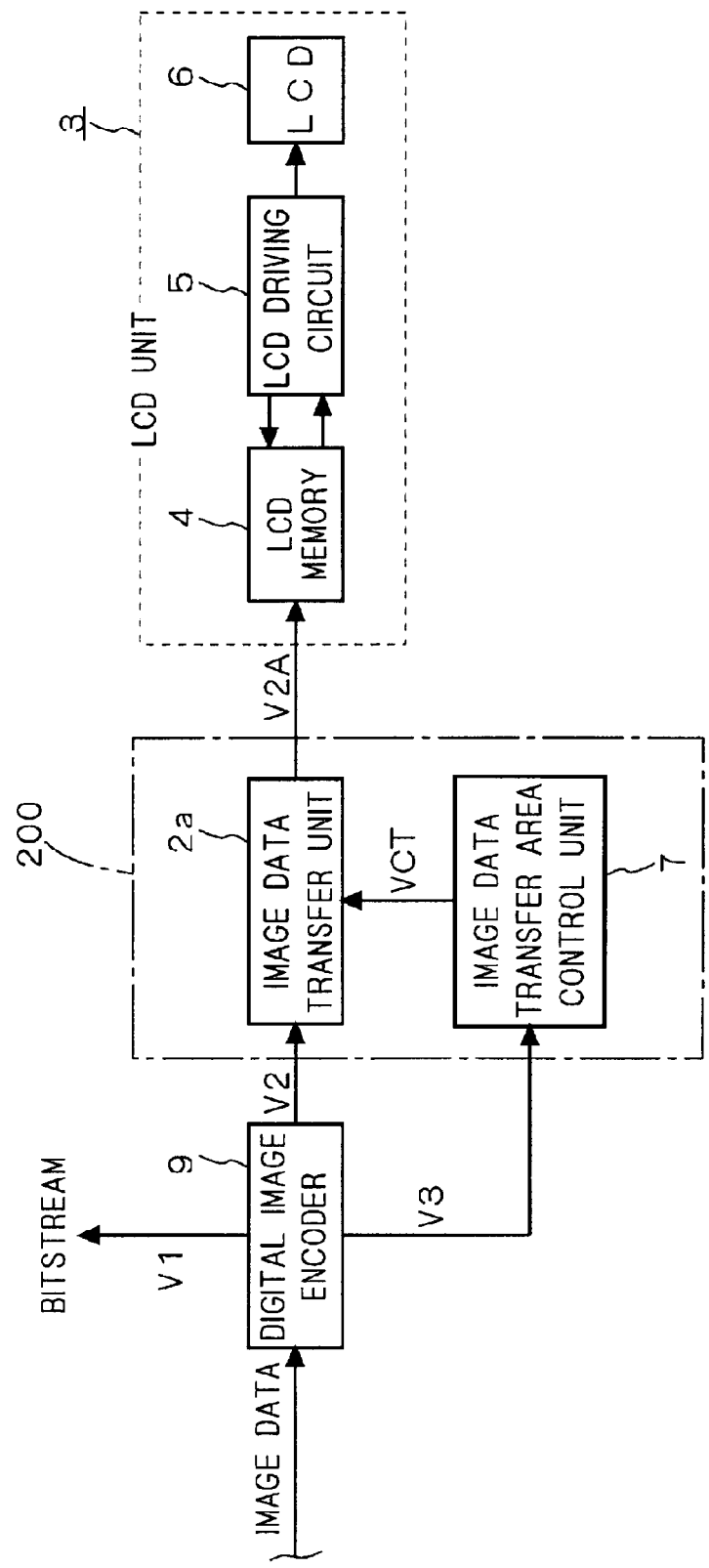
FIG. 4 is a block diagram of a fourth preferred embodiment of the present invention.

FIG. 4 is a block diagram of a digital image output apparatus according to a fourth preferred embodiment of the present invention. In FIG. 4, reference numeral 9 designates a digital image encoder or digital image encoding device that encodes and outputs input digital image data as a bitstream V1, outputs monitor image data V2 for monitoring of an encoded image, and outputs monitor image data update information V3 which provides information about whether the image data has been updated in encoding. Reference numeral 7 designates an image data transfer area control unit for identifying an updated portion on the basis of the third output signal V3 from the digital image encoder 9 and outputs the transfer control signal VCT as a result of the identification for control of the image data transfer unit 2a. The image data transfer unit 2a transfers only an updated portion V2A of the monitor image data or second output signal V2 from the digital image encoder 9 to the LCD memory 4 on the basis of the transfer control signal VCT from the image data transfer area control unit 7. Reference numeral 3 designates an LCD unit for display of the monitor image data V2A transferred from the image data transfer unit 2a. The LCD unit 3 comprises the LCD memory 4 as a monitor image data storage unit for storing the monitor image data V2A transmitted from the image data transfer unit 2a, the LCD driving circuit 5 for retrieving data from the LCD memory 4 and driving the LCD 6, and the LCD 6 for actually displaying the image data, all of which are integrally formed. A monitor image data transfer device 200 identifies a portion of image data which has been updated in encoding (updated portion) according to the monitor image data update information V3, and extracts and transfers only the updated portion V2A of the monitor image data V2 as a result of the identification.

Next, the operation of this output apparatus will be set forth. The digital image encoder 9, when image data is received as an input signal, outputs an encoded bitstream as the first output signal V1. The bitstream is for example transmitted as send data or stored as storage data. For monitoring of the encoded bitstream which is the first output signal V1 or moving images, the digital image encoder 9 also outputs the monitor image data V2, which has been decoded by its internal local decoder, as a second output signal to the image data transfer unit 2a. The second output signal or monitor image data V2 is the equivalent of image data obtained by decoding the encoded bitstream or first output signal V1. The digital image encoder 9 further outputs the third output signal V3 which provides update information about the second output signal or monitor image data V2 to the image data transfer area control unit 7.

The third output signal or monitor image data update information V3 from the digital image encoder 9 is identical in content to the image data update information V2 from the digital image decoder 1a of the first preferred embodiment (cf. FIG. 1).

As in the first preferred embodiment, the digital image encoder 9 may output only monitor image data for an updated block-to-be-encoded as the second output signal or monitor image data V2 and output a signal for identification of a not-updated block-to-be-encoded, i.e., a signal for indicating an block-to-be-encoded whose image data has not been outputted, as the third output signal V3.

The image data transfer area control unit 7 identifies which portion of the second output signal or monitor image data V2 from the digital image encoder 9 has not been updated according to the third output signal or monitor image data update information V3 from the digital image encoder 9, and transmits the transfer control signal VCT as a result of the identification of the updated portion to the image data transfer unit 2a.

The image data transfer unit 2a, on the basis of the output signal VCT from the image data transfer area control unit 7, transfers only the updated portion V2A of the second output signal or monitor image data V2 from the digital image encoder 9 to the LCD memory 4.

The LCD driving circuit 5, in order to drive the LCD 6 for display of an image, retrieves image data from the LCD memory 4 for example at a rate of 60 times per second and transfers it to the LCD 6. The LCD 6 is driven by the LCD driving circuit 5 to display an image.

According to this preferred embodiment, the image data transfer unit 2a transfers only the updated portion of the second output signal or monitor image data V2 from the digital image encoder 9 to the LCD memory 4 on the basis of the output signal VCT from the image data transfer area control unit 7. Therefore, as compared with conventional apparatuses in which all monitor image data is transferred from the digital image encoder 9, this apparatus can avoid a needless transfer operation to transfer exactly the same data as has been previously stored in the LCD memory 4 and to overwrite corresponding part of the LCD memory 4 with the transferred data. This achieves a reduction in power consumption.

While in this preferred embodiment, the image data update information is used to identify a not-updated block or frame, it may be used to identify an updated block or frame.

Further, the image data update information is not limited to block-by-block or frame-by-frame update information but when a frame image consists of rectangular regions each consisting of a plurality of blocks, or consists of fields, or is made with a layered structure, the update information should only indicate whether a specific area in an image or specific part in a sequence of image information, such as a specific layer, has been updated.

A final image output unit in this preferred embodiment is the LCD unit 3 but it is not limited thereto. In fact, it may be any image output unit that includes an image data storage unit for image output, e.g., an image display device using light emitters. Further, the final stage of this apparatus does not have to be the LCD 6 but may be an image data storage unit or a transfer unit.

(Fifth Preferred Embodiment)

Figure 5:
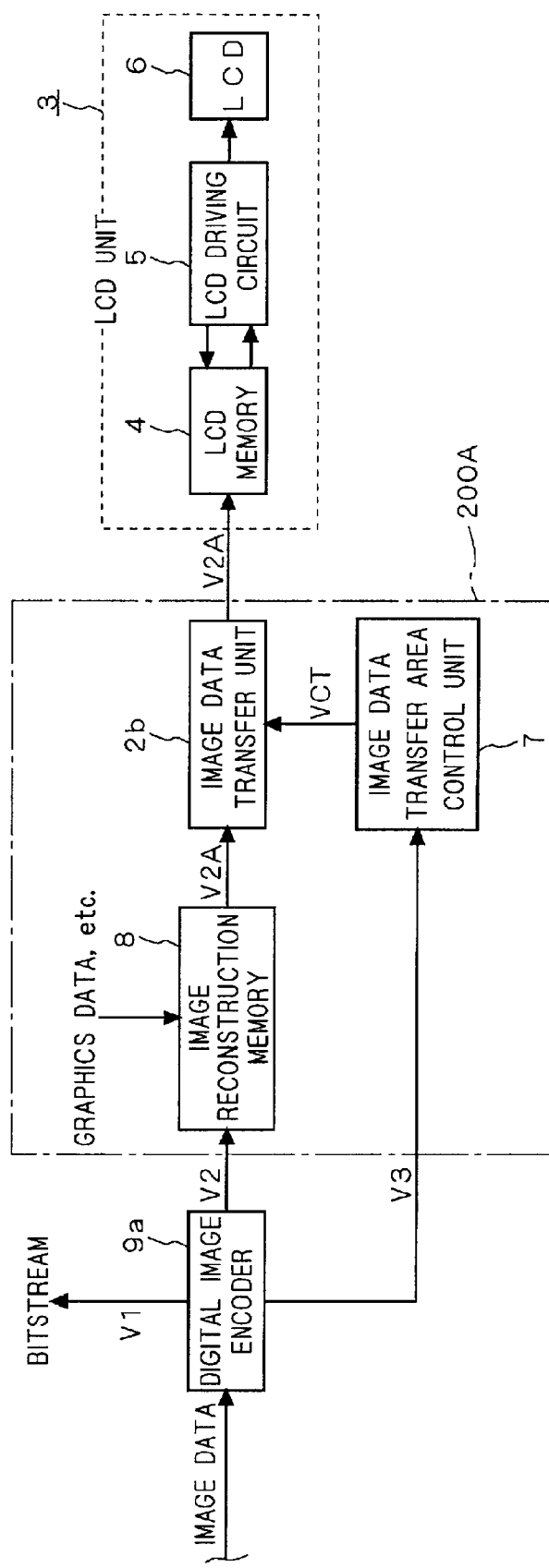
FIG. 5 is a block diagram of a fifth preferred embodiment of the present invention.

FIG. 5 is a block diagram of a digital image output apparatus according to a fifth preferred embodiment of the present invention. In FIG. 5, reference character 9a designates a digital image encoder for encoding of digital image data. Reference numeral 8 designates an image reconstruction memory which reconstructs a single digital image from graphics data or the like and the second output signal V2 from the digital image encoder 9a. Reference numeral 7 designates an image data transfer area control unit for controlling the image data transfer unit 2b on the basis of the third output signal V3 from the digital image encoder 9a. The image data transfer unit 2b transfers monitor image data stored in the image reconstruction memory 8 to the LCD unit 3 under instructions from the image data transfer area control unit 7. The LCD unit 3 displays the monitor image data V2A transferred from the image data transfer unit 2b. The LCD unit 3 comprises the LCD memory 4 for storing the monitor image data V2A transmitted from the image data transfer unit 2b, the LCD driving circuit 5 for retrieving data from the LCD memory 4 and driving the LCD 6, and the LCD 6 for actually displaying the image data, all of which are integrally formed.

Next, the operation of the apparatus will be set forth. The digital image encoder 9a, when image data is received as an input signal, outputs an encoded bitstream as the first output signal V1. For monitoring of the encoded bitstream which is the first output signal V1 or moving images, the digital image encoder 9a also outputs the monitor image data V2 as a second output signal from its internal local decoder to the image reconstruction memory 8. The second output signal or monitor image data V2 is the equivalent of image data obtained by decoding the encoded bitstream or first output signal V1. The digital image encoder 9a also outputs update information about the second output signal or monitor image data V2 as the third output signal V3 to the image data transfer area control unit 7.

The monitor image data update information or third output signal V3 from the digital image encoder 9a is identical in content to the image data update information V2 from the digital image decoder 1a of the first preferred embodiment (cf. FIG. 1).

The image reconstruction memory 8 superimposes a static image such as graphics data or other moving image data on the second output signal or monitor image data V2 from the digital image encoder 9a, thereby to reconstruct a single image.

The image data transfer area control unit 7 identifies which portion of the monitor image data V2 stored in the image reconstruction memory 8 has not been updated according to the monitor image data update information or third output signal V3 from the digital image encoder 9a, and outputs the transfer control signal VCT as a result of the identification of the updated portion to the image data transfer unit 2b.

The image data transfer unit 2b retrieves the monitor image data V2A which corresponds only to the updated portion of the monitor image data V2 from the image reconstruction memory 8 on the basis of the output signal from the image data transfer area control unit 7, and transfers the data V2A to the LCD memory 4.

The LCD driving circuit 5, in order to drive the LCD 6 for display of an image, retrieves image data from the LCD memory 4 for example at a rate of 60 times per second and transfers it to the LCD 6. The LCD 6 is driven by the LCD driving circuit 5 to display an image.

According to this preferred embodiment, the image data transfer unit 2b transfers only the monitor image data V2A corresponding only to the updated portion of the monitor image data V2 stored in the image reconstruction memory 8 to the LCD memory 4 on the basis of the output signal from the image data transfer area control unit 7. Therefore, as compared with conventional apparatuses in which all reconstructed monitor image data is transferred which is obtained by a superimposing of graphics or the like upon the monitor image data V2 from the digital image encoder 9a, this apparatus can avoid a needless transfer operation to transfer exactly the same data as has been previously stored in the LCD memory 4 and to overwrite corresponding part of the LCD memory 4 with the transferred data. This achieves a reduction in power consumption.

While in this preferred embodiment, the monitor image data update information V3 is used to identify a not-updated block or frame, it may be used to identify an updated block or frame.

Further, the monitor image data update information V3 is not limited to block-by-block or frame-by-frame update information but when a frame image consists of rectangular regions each consisting of a plurality of blocks, or consists of fields, or is made with a layered structure, the update information should only indicate whether a specific area in an image or specific part in a sequence of image information, such as a specific layer, has been updated.

A final image output unit in this preferred embodiment is the LCD unit 3 but it is not limited thereto. It may be any image output unit which includes an image data storage unit for image output, e.g., an image display device using light emitters. Further, the final stage of this apparatus does not have to be a display such as the LCD 6 but may be an image data storage unit or a transfer unit.

(Sixth Preferred Embodiment)

Figure 6:
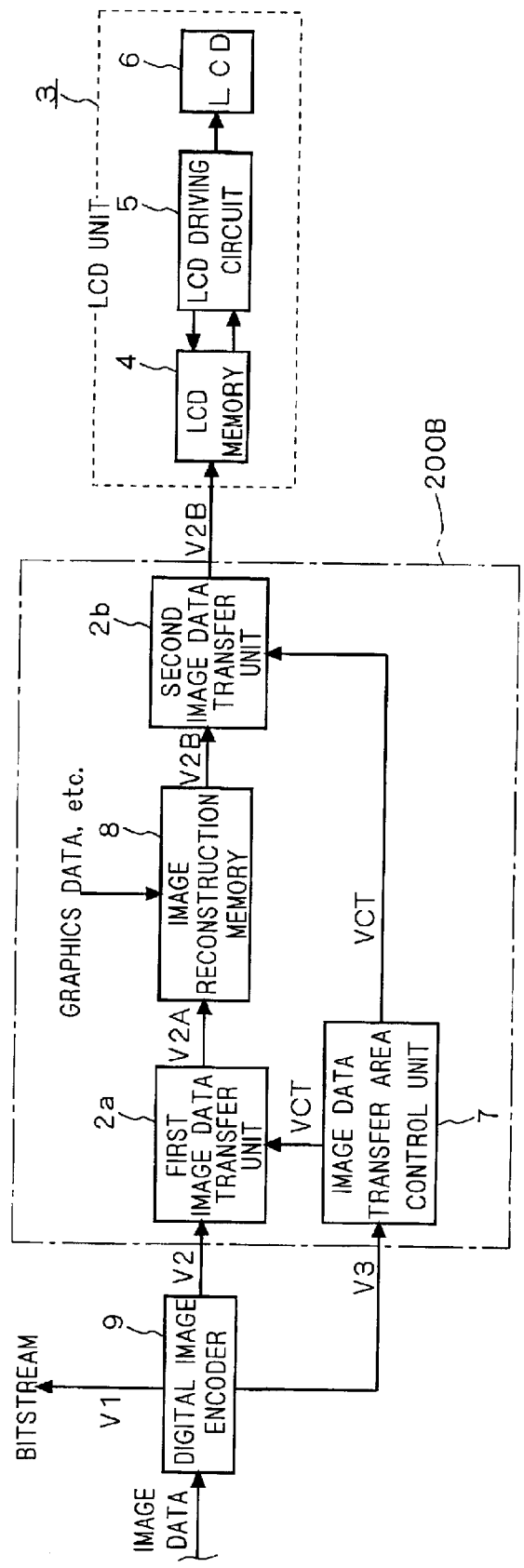
FIG. 6 is a block diagram of a sixth preferred embodiment of the present invention.

FIG. 6 is a block diagram of a digital image output apparatus according to a sixth preferred embodiment of the present invention. In FIG. 6, a circuit 200B has the same function as the circuit 200 of FIG. 4 or the circuit 200A of FIG. 5. Reference numeral 9 designates digital image encoder for encoding of digital image data, and reference numeral 7 designates an image data transfer area control unit for controlling the first image data transfer unit 2a and the second image data transfer unit 2b on the basis of the third output signal V3 from the digital image encoder 9. The first image data transfer unit 2a transfers the second output signal or monitor image data V2 from the digital image encoder 9 to the image reconstruction memory 8 under instructions from the image data transfer area control unit 7. The image reconstruction memory 8 reconstructs a single digital image from graphics data or the like and the output signal V2A from the first image data transfer unit 2a. The second image data transfer unit 2b transfers the monitor image data V2A stored in the image reconstruction memory 8 to the LCD unit 3 under instructions from the image data transfer area control unit 7. The LCD unit 3 displays the image data V2B transferred from the second image data transfer unit 2b. The LCD unit 3 comprises the LCD memory 4 for storing the monitor image data V2B transmitted from the second image data transfer unit 2b, the LCD driving circuit 5 for retrieving data from the LCD memory 4 and driving the LCD 6, and the LCD 6 for actually displaying the monitor image data, all of which are integrally formed.

Next, the operation of the apparatus will be set forth. The digital image encoder 9, when image data is received as an input signal, an encoded bitstream as the first output signal V1. For monitoring of the encoded bitstream which is the first output signal V1 or moving images, the digital image encoder 9 also outputs the monitor image data V2 as a second output signal from its internal local decoder to the first image data transfer unit 2a. The monitor image data V2 here is the equivalent of image data obtained by decoding the first output signal or encoded bitstream V1. The digital image encoder 9 further outputs update information about the monitor image data V2 as a third output signal V3 to the image data transfer area control unit 7.

The monitor image data update information or third output signal V3 from the digital image encoder 9 is identical in content to the image data update information V2 from the digital image decoder 1a of the first preferred embodiment (cf. FIG. 1).

As in the first preferred embodiment, the digital image encoder 9 may output only digital image data for an updated block-to-be-encoded as the second output signal or monitor image data V2 and output a signal for identification of a not-updated block-to-be-encoded, i.e., a signal for indicating a block-to-be-encoded whose image data has not been outputted, as the third output signal V3.

The image data transfer area control unit 7 identifies which portion of the monitor digital image data or second output signal V2 from the digital image encoder 9 has not been updated according to the monitor image data update information or third output signal V3 from the digital image encoder 9. As a result of the identification of the updated portion, the transfer control signal VCT is transmitted to the first and second image data transfer units 2a and 2b.

The first image data transfer unit 2a transfers only the updated portion V2A of the monitor image data V2 from the digital image encoder 9 to the image reconstruction memory 8 on the basis of the output from the image data transfer area control unit 7.

The image reconstruction memory 8 superimposes a static image such as graphics data or other moving image data on the monitor image data or output signal V2A from the first image data transfer unit 2a, thereby to reconstruct a single image.

The second image data transfer unit 2b retrieves the monitor image data V2B which corresponds only to the updated portion of the monitor image data V2A from the image reconstruction memory 8 on the basis of the output from the image data transfer area control unit 7, and transfers it to the LCD memory 4.

The LCD driving circuit 5, in order to drive the LCD 6 for display of an image, retrieves digital image data from the LCD memory 4 for example at a rate of 60 times per second and transfers it to the LCD 6. The LCD 6 is driven by the LCD driving circuit 5 to display an image.

According to this preferred embodiment, the first image data transfer unit 2a transfers only the updated portion of the monitor image data or second output signal V2 from the digital image encoder 9 to the image reconstruction memory 8 on the basis of the output from the image data transfer area control unit 7. Besides, the second image data transfer unit 2b transfers the monitor image data corresponding only to the updated portion of the monitor image data stored in the image reconstruction memory 8 to the LCD memory 4. Thus, this apparatus can simultaneously avoid a needless transfer operation to transfer exactly the same data as has been previously stored in the image reconstruction memory 8 and to overwrite corresponding part of the memory 8 with the transferred data, and a needless transfer operation to transfer exactly the same data as has been previously stored in the LCD memory 4 and to overwrite corresponding part of the LCD memory 4 with the transferred data. This achieves a further reduction in power consumption.

While in this preferred embodiment, the monitor image data update information is used to identify a not-updated block or frame, it may be used to identify an updated block or frame.

Further, the monitor image data update information is not limited to block-by-block or frame-by-frame update information but when a frame image consists of rectangular regions each consisting of a plurality of blocks, or consists of fields, or is made with a layered structure, the update information should only indicate whether a specific area in an image or specific part in a sequence of image information, such as a specific layer, has been updated.

A final image output unit in this preferred embodiment is the LCD unit 3 but it is not limited thereto. It may be any image output unit that includes an image data storage unit for image output, e.g., an image display device using light emitters. Further, the LCD 6 may be replaced by an image data storage unit or an image data transfer unit.

(Seventh Preferred Embodiment)

Figure 7:
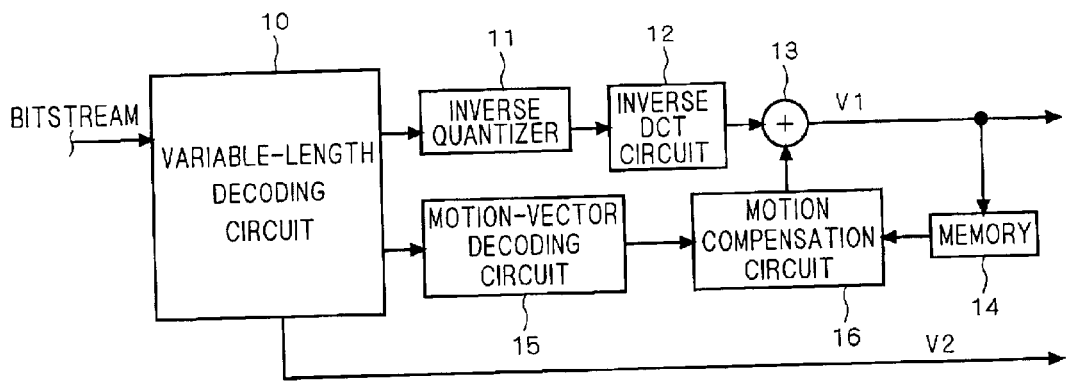
FIG. 7 is a block diagram of a seventh preferred embodiment of the present invention.

FIG. 7 is a block diagram of a digital image decoding device according to a seventh preferred embodiment of the present invention. This is equivalent to the digital image decoder 1a of FIG. 1 or 3 or the digital image decoder 1b of FIG. 2. In FIG. 7, reference numeral 10 designates a variable-length decoding circuit for decoding of a variable-length code in a bitstream. Each block of quantized image data which is a first output signal from the variable-length decoding circuit 10 is transmitted through an inverse quantizer 11 and an inverse DCT circuit 12 to an adder 13 to be a first input signal. An output signal from the adder 13 is outputted as-is as digital image data V1 for each block and is also stored in a memory 14. On the other hand, a code indicating a motion vector, which is a second output signal from the variable-length decoding circuit 10, is decoded by a motion-vector decoding circuit 15 to be motion vector information. A motion compensation circuit 16 produces prediction image data from the image data stored in the memory 14 and the motion vector information from the motion-vector decoding circuit 15 and outputs it as a second input signal for the adder 13.

When as a result of variable-length decoding, a block of quantized image data, i.e., the first output signal, is all 0 and the code indicating the motion vector, i.e., the second output signal is 0, the variable-length decoding circuit 10 determines that a corresponding block-to-be-encoded has not been updated and outputs a signal for indicating that the block-to-be-encoded has not been updated as a third output signal or image data update information V2. On the other hand, when all a block of quantized image data, i.e., the first output signal is not 0 or when the code indicating the motion vector, i.e., the second output signal is not 0, the decoding circuit 10 determines that a corresponding block-to-be-encoded has been updated and outputs a signal for indicating that the block-to-be-encoded has been updated as the image data update information V2.

Where possible, the image data stored in the memory 14 may be outputted as the whole image data in the digital image decoding device.

Figure 8:
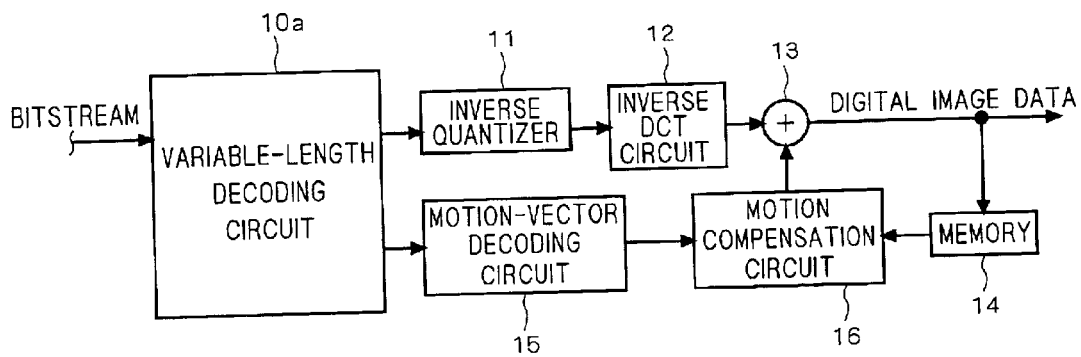
FIG. 8 is a block diagram of a conventional digital image decoding device.

For purposes of illustration of the operation according to the seventh preferred embodiment of the present invention, a conventional digital image decoding device is shown in FIG. 8. This decoding device is described on pages 39 and 40 of the "All About MPEG=4", published by KOGYO CYOSAKAI Publishing Company Ltd., which is for example equivalent to the digital image decoder 1 in the conventional digital image output apparatus shown in FIG. 11.

In FIG. 8, the individual operations of the inverse quantizer 11, the inverse DCT circuit 12, the adder 13, the memory 14, the motion-vector decoding circuit 15, and the motion compensation circuit 16 are identical to those described in the seventh preferred embodiment of the present invention shown in FIG. 7. A variable-length decoding circuit 10a, on the other hand, only outputs a first output signal to the inverse quantizer 11 and a second output signal to the motion-vector decoding circuit 15, wherein there is no output corresponding to the third output signal V2 as illustrated in FIG. 7.

First, the operation of the conventional decoding device will be set forth with reference to FIG. 8. The variable-length decoding circuit 10a, upon receipt of a bitstream, outputs a quantized DCT coefficient as a first output signal and a motion vector signal as a second output signal. The first output signal is subjected to inverse quantization by the inverse quantizer 11 and further to inverse DCT by the inverse DCT circuit 12, the result of which is fed to a first input end of the adder 13 as macroblock data. An output signal from the adder 13 is outputted as image data and is also stored in the memory 14 for use in decoding of a next image.

The second output signal from the variable-length decoding circuit 10a is decoded by the motion-vector decoding circuit 15 to be motion vector data. The motion compensation circuit 16 performs motion compensation by using the immediately preceding image data stored in the memory 14 and the motion vector data from the motion-vector decoding circuit 15. The adder 13 then adds resultant data to the output signal from the inverse DCT circuit 12 to obtain image data.

At this time, when the first output signal is 0 and the second output signal or motion vector information is also 0 as a result of decoding of a certain macroblock by the variable-length decoding circuit 10a, the motion compensation circuit 16 outputs data stored in the memory 14 as-is. Consequently, exactly the same data as the previous image data in the memory 14 is outputted as an output signal from the adder 13, i.e., image data.

Such operations, as has been previously described in connection with the conventional digital image output apparatus, become factors of needless power consumption in the digital image output apparatus.

Next, the operation according to the seventh preferred embodiment of the 5 present invention will be set forth with reference to FIG. 7. The digital image decoding device of FIG. 7 is almost identical to the conventional digital image decoding device of FIG. 8, except for the operation of the variable-length decoding circuit 10.

When as a result of decoding of a certain macroblock, the first output signal is 0 and the second output signal or motion vector information is also 0, the variable-length decoding circuit 10 outputs the signal V2 for indicating that image data for a macroblock being decoded is exactly the same as the previous data, as a third output signal or image data update information. This makes implementable the digital image output apparatuses of the first through third preferred embodiments and reduces needless power consumption that is caused by transferring exactly the same data as has been previously stored in the image data storage unit and overwriting corresponding part of the storage unit with the transferred data.

The image data update information V2 in FIG. 7 may be any signal that permits identification of a macroblock for which exactly the same data is to be outputted.

While the above description of this preferred embodiment provides an example of application for macroblocks, this preferred embodiment is also applicable to the case of a frame being skipped. More specifically, for example when a certain frame is skipped, there is no corresponding encoded data for that frame or only a header exists. When as a result of decoding of a certain frame, there is no corresponding encoded data for that frame or only a header exists, the variable-length decoding circuit 10 of FIG. 7 determines that the frame concerned has been skipped and then outputs, as the third output signal, the image data update information V2 which indicates that exactly the same data as for the previous frame is outputted for the frame being decoded. This permits frame-by-frame control. Alternatively, the variable-length decoding circuit 10 of FIG. 7 may simultaneously output macroblock-by-macroblock image data update information and frame-by-frame image data update information. This permits both macroblock-by-macroblock and frame-by-frame control.

While in this preferred embodiment, the image data update information V2 is used to identify a not-updated block or frame, it may be used to identify an updated block or frame.

Further, the image data update information V2 is not limited to block-by-block or frame-by-frame update information but when a frame image consists of rectangular regions each consisting of a plurality of blocks, or consists of fields, or is made with a layered structure, the update information V2 should only indicate whether a specific area in an image or specific part in a sequence of image information, such as a specific layer, has been updated.

While the image data update information V2 is outputted from the variable-length decoding circuit 10, it is also possible to provide an additional unit which can determine whether image data has been updated. For example, such an additional unit may be provided that determines whether image data has been updated in encoding by the first and second output signals from the variable-length decoding circuit 10 and outputs image data update information. In this case, the variable-length decoding circuit 10 performs the same function as the conventional variable-length decoding circuit 10a of FIG. 8.

(Eighth Preferred Embodiment)

Figure 9:
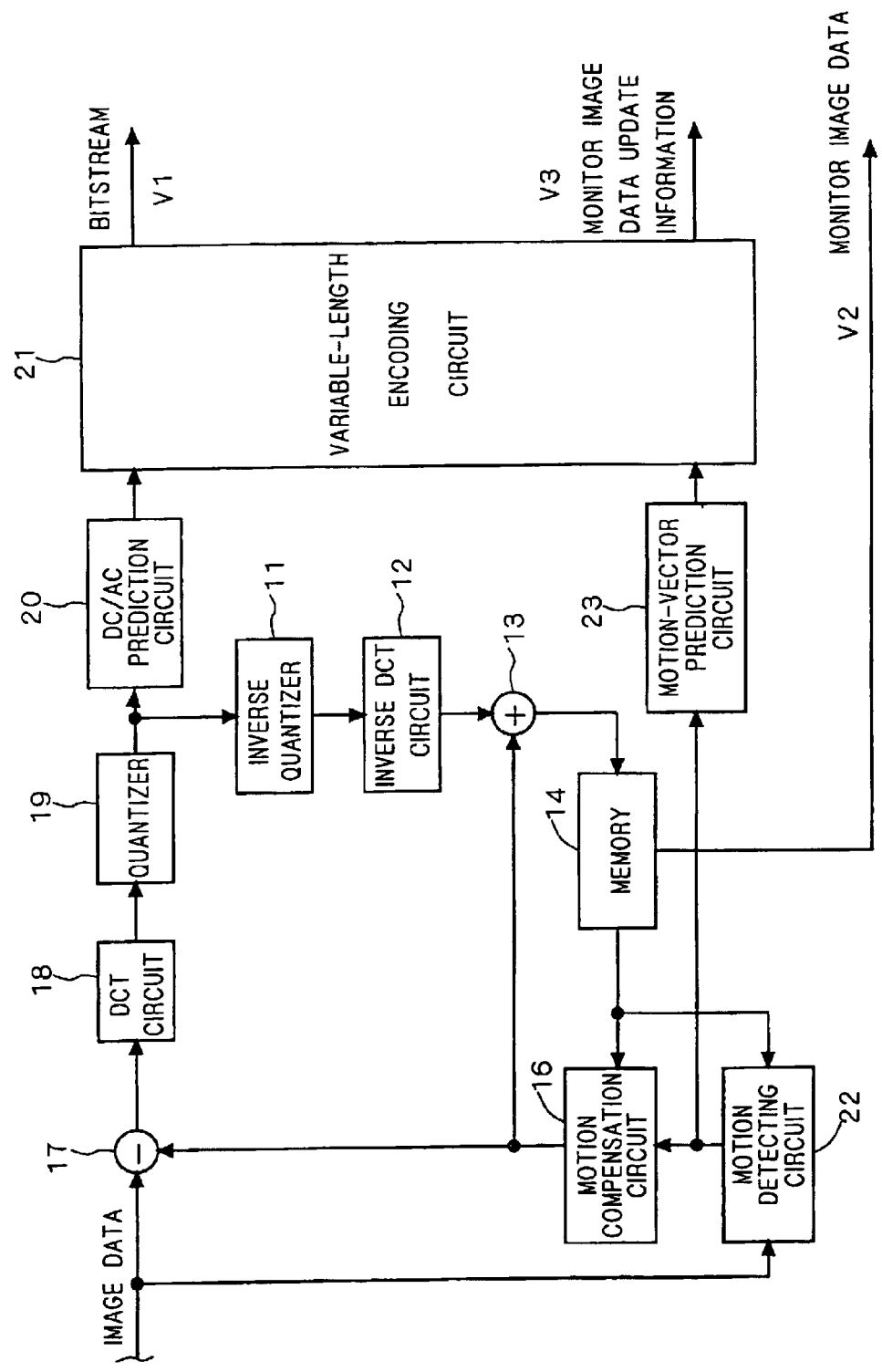
FIG. 9 is a block diagram of an eighth preferred embodiment of the present invention.

FIG. 9 is a block diagram of a digital image encoding device according to an eighth preferred embodiment of the present invention, which is for example equivalent to the digital image encoder 9 of FIG. 4 or 6 or the digital image encoder 9a of FIG. 5. In FIG. 9, reference numeral 17 designates a subtractor which receives an input signal at its first input end. An output signal from the subtractor 17 is transmitted through a DCT circuit 18 and a quantizer 19 to a DC/AC prediction circuit 20 and an inverse quantizer 11. An output signal from the DC/AC prediction circuit 20 is fed to a first input end of a variable-length encoding circuit 21 which then outputs a bitstream V1 as a first output signal. An output signal from the inverse quantizer 11 is transmitted through an inverse DCT circuit 12 to a first input end of the adder 13. An output signal from the adder 13 is fed to a memory 14 and an output signal from the memory 14 is fed to a first input end of the motion compensation circuit 16 and to a first input end of a motion detecting circuit 22. The motion detecting circuit 22 receives, at its second input end, an input signal or image data, and an output signal from the motion detecting circuit 22 is fed to a second input end of the motion compensation circuit 16 and a motion-vector prediction circuit 23. An output signal from the motion-vector prediction circuit 23 is fed to a second input end of the variable-length encoding circuit 21. An output signal from the motion compensation circuit 16 is fed to a second input end of the subtractor 17 and to a second input end of the adder 13.

The memory 14 outputs image data stored therein as monitor image data V2, and the variable-length encoding circuit 21 outputs monitor image data update information V3 as a second output signal.

Figure 10:
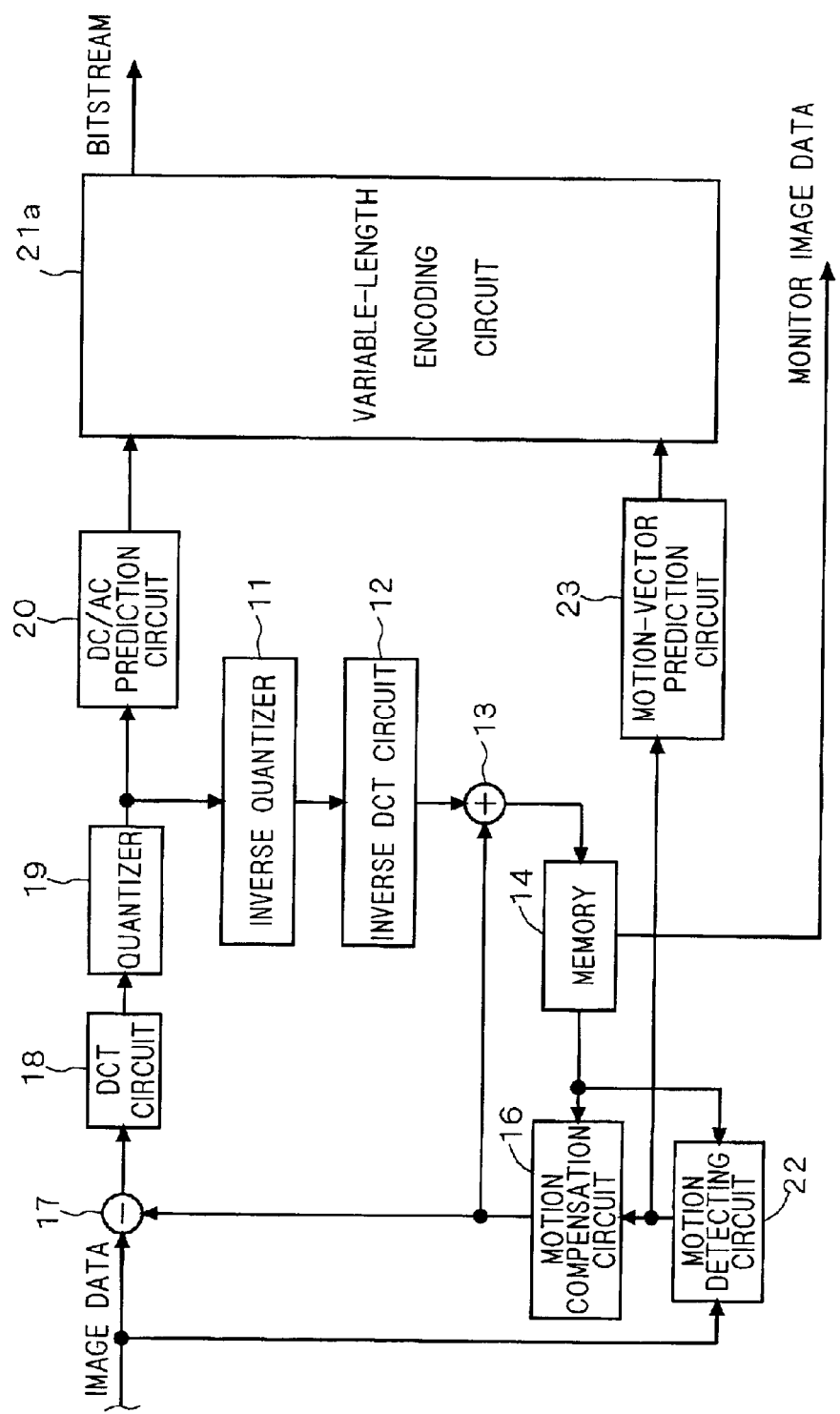
FIG. 10 is a block diagram of a conventional digital image encoding device.

For purposes of illustration of the operation according to the eighth preferred embodiment of the present invention, a block diagram of a conventional digital image encoding device is shown in FIG. 10. This encoding device is described on pages 39 and 40 of the "All About MPEG-4", published by KOGYO CYOSAKAI Publishing Company Ltd.

In FIG. 10, individual operations of the subtractor 17, the DCT circuit 18, the quantizer 19, the DC/AC predicting circuit 20, the inverse quantizer 11, the inverse DCT circuit 12, the adder 13, the memory 14, the motion compensation circuit 16, the motion detecting circuit 22, and the motion-vector predicting circuit 23 are identical to those described in the eighth preferred embodiment of the present invention with reference to FIG. 9. However, a variable-length encoding device 21a only outputs a bitstream and does not output monitor image data update information.

First, the operation of the conventional encoding device will be set forth with reference to FIG. 10. In FIG. 10, a configuration constituted by the inverse quantizer 11, the inverse DCT circuit 12, the adder 13, the memory 14, and the motion compensation circuit 16 is identical to part of the digital image decoding device shown in FIG. 8. This is because a decoding process is necessary for production of a prediction image through motion compensation during encoding. Thus, the same thing as has been previously described in connection with the digital image decoding device of the seventh preferred embodiment will occur in the digital image encoding device shown in FIG. 10. More specifically, when the output signal from the quantizer 19 is 0, i.e., when the output signal from the inverse DCT circuit 12 is 0 and the output signal from the motion detector 22 is also 0 which is information indicating a motion vector, the motion compensation circuit 16 outputs data stored in the memory 14 as-is. Consequently, exactly the same data as the previous image data in the memory 14 is outputted as an output signal, i.e., monitor image data, from the adder 13.

Such operations, as has been previously described in connection with the conventional digital image output apparatus, become factors of needless power consumption in the digital image output apparatus.

Next, the operation according to the eighth preferred embodiment of the present invention will be set forth with reference to FIG. 9. The encoding device of FIG. 9 is almost identical to the conventional digital encoding device of FIG. 10, except for the operation of the variable-length encoding circuit 21.

When as a result of encoding of a certain macroblock, the output signal from the DC/AC prediction circuit 20, i.e., the first input signal of the variable-length encoding circuit 21 indicates that the output signal from the quantizer 19 is 0 and the output signal from the motion-vector prediction circuit 23, i.e., the second input signal of the variable-length encoding circuit 21 indicates that the motion vector is 0, the variable-length encoding circuit 21 outputs, as a second output signal, the monitor image data update information V3 which is a signal for indicating that exactly the same data as the previous data is outputted as image data for a macroblock now being encoded. On the other hand, when the output signal from the DC/AC prediction circuit 20, i.e., the first input signal of the variable-length encoding circuit 21 indicates that the output signal from the quantizer 19 is not 0 or when the output signal from the motion-vector prediction circuit 23, i.e., the second input signal of the variable-length encoding circuit 21 indicates that the motion vector is not 0, the variable-length encoding circuit 21 determines that a corresponding block-to-be-encoded has been updated and outputs, as a second output signal, the monitor image data update information V3 which is a signal for indicating that data which is different from the previous data is outputted as image data for a macroblock now being encoded. This makes implementable the digital image output apparatuses of the fourth through sixth preferred embodiments and allows a reduction in needless power consumption that is caused by transferring exactly the same data as has been previously stored in the image data storage unit and overwriting corresponding part of the storage unit with the transferred data.

The monitor image data update information V3 is not limited to the aforementioned one as long as it permits identification of a macroblock for which exactly the same data is to be outputted.

While the above description of this preferred embodiment provides an example of application for macroblocks, this preferred embodiment is also applicable to the case of a frame being skipped. Frame skipping results from the variable-length encoding circuit 21 controlling the amount of encoding. When the variable-length encoding circuit 21 decides for doing frame skipping, the encoding circuit 21 performs frame skipping and at the same time, outputs the monitor image data update information V3 which is a signal for indicating that a frame now being encoded is exactly the same as the previous frame, as a second output signal. This permits frame-by-frame control. Alternatively, the encoding circuit 21 may output macroblock-by-macroblock monitor image data update information and frame-by-frame monitor image data update information simultaneously. In this case, both macroblock-by-macroblock and frame-by-frame control becomes possible.

While in this preferred embodiment, the monitor image data update information V3 is used to identify a not-updated block or frame, it may be used to identify an updated block or frame.

Further, the monitor image data update information V3 is not limited to block-by-block or frame-by-frame update information but when a frame image consists of rectangular regions each consisting of a plurality of blocks, or consists of fields, or is made with a layered structure, the update information V3 should only indicate whether a specific area in an image or specific part in a sequence of image information, such as a specific layer, has been updated.

Further, while the monitor image data update information V3 is outputted from the variable-length encoding circuit 21, it is also possible to provided an additional unit that can determine whether the monitor image data has been updated. For example, such a unit may be provided that determines whether monitor image data has been updated by the first and second input signals of the variable-length encoding circuit 21 and outputs monitor image data update information. In this case, the variable-length encoding circuit 21 performs the same function as the conventional variable-length encoding circuit 21a.

While the invention has been shown and described in detail, the foregoing description is in all aspects illustrative and not restrictive. It is therefore understood that numerous modifications and variations can be devised without departing from the scope of the invention.

What is claimed is:

1. A digital image output apparatus, comprising:

a digital image decoding device including:

a first portion receiving encoded digital image data, a second portion connected to said first portion and decoding said encoded digital image data to output decoded digital image data, and a third portion connected to said first portion and generating image data update information which provides information about whether digital image data has been updated in encoding, based on said encoded digital image data to output said image data update information;

a digital image data transfer device connected to said digital image decoding device and identifying an updated portion of said decoded digital image data outputted from said digital image decoding device based on said image data update information outputted from said digital image decoding device, said updated portion having been updated in encoding, thereby to transfer only said updated portion of said decoded digital image data as a result of said identification; and a digital image data storage device connected to said digital image data transfer device and storing said decoded digital image data transferred and outputted from said digital image data transfer device.

2. The digital image output apparatus according to claim 1, wherein said image data update information is either block-by-block update information, each block constituting part of an image, or frame-by-frame update information.

3. The digital image output apparatus according to claim 1, wherein said image data update information includes both block-by-block update information, each block constituting part of an image, and frame-by-frame update information.

4. The digital image output apparatus according to claim 1, wherein said digital image data transfer device includes, an image data transfer area control unit connected to said digital image decoding device and identifying said updated portion based on said image data update information, thereby to output a transfer control signal as a result of said identification, and an image data transfer unit connected to said digital image decoding device, said image data transfer area control unit, and said digital image data storage device, and on the basis of said transfer control signal, transferring only said updated portion of said decoded digital image data outputted from said digital image decoding device, to said digital image data storage device.

5. The digital image output apparatus according to claim 1, wherein said digital image data transfer device includes, an image data transfer area control unit connected to said digital image decoding device, identifying said updated portion based on said image data update information, and outputting a transfer control signal as a result of said identification, an image reconstruction data storage unit connected to said digital image decoding device and reconstructing a single image from said decoded digital image data outputted from said digital image decoding device, and an image data transfer unit connected to said image reconstruction data storage unit, said image data transfer area control unit, and said digital image data storage device, and on the basis of said transfer control signal, retrieving digital image data corresponding only to said updated portion from said image reconstruction data storage unit to transfer it to said digital image data storage device.

6. The digital image output apparatus according to claim 1, wherein said digital image data transfer device includes, an image data transfer area control unit connected to said digital image decoding device, identifying said updated portion based on said image data update information and outputting a transfer control signal as a result of said identification, a first image data transfer unit connected to both said digital image decoding device and said image data transfer area control unit, and on the basis of said transfer control signal, transferring only said updated portion of said decoded digital image data outputted from said digital image decoding device, an image reconstruction data storage unit connected to said first image data transfer unit and reconstructing a single image from said updated portion of said decoded digital image data outputted from said first image data transfer unit, and a second image data transfer unit connected to said image reconstruction data storage unit, said image data transfer area control unit, and said digital image data storage device, and on the basis of said transfer control signal, retrieving digital image data corresponding only to said updated portion from said image reconstruction data storage unit to transfer it to said digital image data storage device.

7. A digital image output apparatus, comprising:

a digital image encoding device including;

means for encoding digital image data to output monitor image data for monitoring of an encoded image, and means for outputting monitor image data update information, which provides information about whether said digital image data has been updated in encoding;

a monitor image data transfer device configured to identify an updated portion of said monitor image data outputted from said digital image encoding device based on said monitor image data update information outputted from said digital image encoding device, said updated portion having been updated in encoding, and to transfer only said updated portion of said monitor image data as a result of said identification; and a monitor image data storage device configured to store said monitor image data transferred and outputted from said monitor image data transfer device.

8. The digital image output apparatus according to claim 7, wherein said monitor image data update information is either block-by-block update information, each block constituting part of an image, or frame-by-frame update information.

9. The digital image output apparatus according to claim 7, wherein said monitor image data update information includes both block-by-block update information, each block constituting part of an image, and frame-by-frame update information.

10. The digital image output apparatus according to claim 7, wherein said monitor image data transfer device includes, an image data transfer area control unit configured to identify said updated portion based on said monitor image data update information and to output a transfer control signal as a result of said identification, and an image data transfer unit configured to, on the basis of said transfer control signal, transfer only said updated portion of said monitor image data outputted from said digital image encoding device, to said monitor image data storage device.

11. The digital image output apparatus according to claim 7, wherein said monitor image data transfer device includes, an image data transfer area control unit configured to identify said updated portion based on said monitor image data update information and to output a transfer control signal as a result of said identification, an image reconstruction data storage unit configured to reconstruct a single image from said monitor image data outputted from said digital image encoding device, and an image data transfer unit configured to, on the basis of said transfer control signal, retrieve monitor image data corresponding only to said updated portion from said image reconstruction data storage unit and to transfer it to said monitor image data storage device.

12. The digital image output apparatus according to claim 7, wherein said monitor image data transfer device includes, an image data transfer area control unit configured to identify said updated portion based on said monitor image data update information and to output a transfer control signal as a result of said identification, a first image data transfer unit configured to, on the basis of said transfer control signal, transfer only said updated portion of said monitor image data outputted from said digital image encoding device, an image reconstruction data storage unit configured to reconstruct a single image from said updated portion of said monitor image data outputted from said first image data transfer unit, and a second image data transfer unit configured to, on the basis of said transfer control signal, retrieve monitor image data corresponding only to said updated portion from said image reconstruction data storage unit and to transfer it to said monitor image data storage device.

* * * * *